US008555179B2

(12) United States Patent  
Lee et al.

(10) Patent No.: US 8,555,179 B2  
(45) Date of Patent: Oct. 8, 2013

(54) MOBILE COMMUNICATION TERMINAL HAVING TOUCH SCREEN AND METHOD OF CONTROLLING THE SAME

(75) Inventors: Ha Youn Lee, Seoul (KR); Eun Young Lee, Seoul (KR); Min Hak Lee, Seoul (KR); Moon Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 877 days.

(21) Appl. No.: 12/191,955

(22) Filed: Aug. 14, 2008

(65) Prior Publication Data

US 2009/0049395 A1    Feb. 19, 2009

(30) Foreign Application Priority Data

Aug. 16, 2007 (KR) .................. 10-2007-0082427

(51) Int. Cl.
*G06F 3/00* (2006.01)
*G06F 3/048* (2013.01)
*G06F 3/14* (2006.01)
*H04N 7/14* (2006.01)

(52) U.S. Cl.
USPC ......... 715/758; 715/788; 715/864; 348/14.03

(58) Field of Classification Search
USPC ..... 348/14.01, 14.02, 14.03, 14.07; 715/751, 715/752, 753, 758, 764, 788, 798, 863, 864, 715/800, 801, 799, 770
See application file for complete search history.

(56) References Cited

U.S. PATENT DOCUMENTS

| | | | |
|---|---|---|---|
| 6,313,853 B1 | 11/2001 | Lamontagne et al. | |
| 6,570,594 B1 * | 5/2003 | Wagner | 715/786 |
| 7,036,086 B2 * | 4/2006 | Cobbley et al. | 715/773 |
| 7,761,507 B2 * | 7/2010 | Herf et al. | 715/753 |
| 7,941,760 B2 * | 5/2011 | Kocienda et al. | 715/773 |
| 2005/0060656 A1 * | 3/2005 | Martinez et al. | 715/751 |
| 2007/0152978 A1 * | 7/2007 | Kocienda et al. | 345/173 |
| 2008/0003985 A1 * | 1/2008 | Jung et al. | 455/414.1 |
| 2008/0307322 A1 * | 12/2008 | Stochosky et al. | 715/752 |
| 2009/0178062 A1 * | 7/2009 | Westen | 719/328 |

FOREIGN PATENT DOCUMENTS

| | | |
|---|---|---|
| EP | 1 104 153 A2 | 5/2001 |
| WO | WO 2004/104758 A2 | 12/2004 |

* cited by examiner

*Primary Examiner* — Haoshian Shih  
(74) *Attorney, Agent, or Firm* — Birch, Stewart, Kolasch & Birch, LLP

(57) ABSTRACT

A mobile communication terminal having a camera module and a touch screen is provided. The mobile communication terminal transmits and receives text data while performing the video call with at least one other party's terminal. The touch screen displays at least one images when the text data transmission and reception function is started, an input window for displaying text data input through the touch screen, an output window for displaying the transmitted and received text data, and at least one soft key, and a controller for controlling, when the input window or one of the at least one soft key is selected, the touch screen for changing a display method of at least one of the first image, the second image, the input window, the output window, and the at least one soft key and for displaying a touch pad comprising a plurality of keys for inputting text data.

20 Claims, 24 Drawing Sheets

MOBILE COMMUNICATION TERMINAL HAVING TOUCH SCREEN AND METHOD OF CONTROLLING THE SAME

CROSS REFERENCE TO RELATED APPLICATIONS

This application claims priority under 35 U.S.C. §119(a) on Patent Application No. 10-2007-0082427 filed in Republic of Korea on Aug. 16, 2007, the entire contents of which are hereby incorporated by reference.

BACKGROUND OF THE INVENTION

1. Field of the Invention

This document relates to a mobile communication terminal having a touch screen and a method of controlling the same.

2. Discussion of the Related Art

Nowadays, according to a multimedia service such as video call or video chatting according to technical development and a next generation mobile communication service is introduced, a mobile communication terminal uses a display having a size as large as possible in order to display an image thereof.

Particularly, in order to satisfy a request for a large display while decreasing a size of the mobile communication terminal in consideration of mobility, the mobile communication terminal has used a touch screen that can perform both a display function and an input function.

However, nowadays, the mobile communication terminal does not provide various control methods in consideration of characteristics of a touch screen in order to perform a multimedia service.

SUMMARY OF THE INVENTION

An aspect of this document is to provide a mobile communication terminal having a touch screen, a method of controlling the same that can control the mobile communication terminal according to characteristics of the touch screen, and a corresponding computer program product.

In one general aspect, a mobile communication terminal comprises: a communication module for performing a transmission and reception function of image and audio data corresponding to a video call with at least one other party's terminal and text data while performing the video call; a camera module for photographing an image; a memory for storing at least one image; a touch screen for displaying a first image received from the at least one other party's terminal and a second image acquired from the camera module or stored in the memory and displaying, when the text data transmission and reception function is started, an input window for displaying text data input through the touch screen, an output window for displaying the transmitted and received text data, and at least one soft key; and a controller for controlling, when the input window or one of the at least one soft key is selected, the touch screen for changing a display method of at least one of the first image, the second image, the input window, the output window, and the at least one soft key and for displaying a touch pad comprising a plurality of keys for inputting text data.

The controller may control the touch screen to delete, when the output window or another of the at least one soft key is selected, the touch pad displayed on the touch screen; and to change a display method of at least one of the first image, the second image, the input window, the output window, and the at least one soft key.

The controller may control to display text data input through the touch pad on the input window and to transmit, when another of the at least one soft key is selected, the input text data to the at least one other party's terminal.

The controller may control to display a guide for inducing a touch of the input window on the input window.

The touch pad may comprise a direction key for scrolling text data input to the input window.

The controller may control to vertically display the first image and the second image at the upper side or the lower side of the touch pad and to display the output window at the left side or the right side of the first image and the second image, when the touch pad is displayed.

The controller may control, when an upper part or a lower part within the output window is touched, to scroll the transmitted or received text data to the lower side or the upper side.

The controller may control, when the upper part or the lower part is touched, to display a direction key for displaying that the transmitted or received text data are scrolled to the lower side or the upper side, on the touch screen.

The direction key may be translucently displayed.

The controller may control to display a scroll bar at the left side or the right side of the output window and to display, when the scroll bar is touched, an upper or lower direction key for scrolling the transmitted or received text data within or around the area.

The controller may control, when the text data are input, if a predetermined key of the touch pad is selected, to scroll the text data displayed on the input window.

The controller may control, when the text data are input, if the input window is touched and dragged to the left side or the right side, to scroll the text data displayed on the input window to the left side or the right side.

The at least one soft key may be changed to comprise a key for providing a menu for inputting a commonly used word when the touch pad is displayed.

The controller may control, when a menu key for inputting the commonly used word is selected, to display a screen comprising a list of at least one commonly used word on the touch screen.

The at least one commonly used word may be preset by a user.

The controller may control, when one of the at least one commonly used word is selected, to display the selected commonly used word on the input window.

The at least one soft key may comprise a soft key for inputting a symbol.

The controller may control, when the soft key for inputting a symbol is selected, to display a screen for displaying at least one symbol and to display, when one of symbols displayed on the screen is selected, the selected symbol on the input window.

The controller may control to distinguishably display the received text data and the transmitted text data on the output window using the first image, the second image, or at least one of other images stored in the mobile communication terminal.

The memory may store text data, and the controller may control, when the at least one soft key is selected, to execute an application for retrieving text data stored in the memory and to display, when at least a part of the found text data is selected, the selected text data on the input window.

In another aspect, a method of controlling a mobile communication terminal for providing a text data transmission and reception function while performing a video call with at least one other party's terminal by comprising a touch screen and a camera module comprises: displaying a first image received from the at least one other party's terminal and a second image acquired from the camera module or stored in the mobile communication terminal on the touch screen; displaying, when the text data transmission and reception function is started, an input window for displaying text data input through the touch screen, an output window for displaying transmitted and received text data, and at least one soft key; and displaying, when the input window or one of the at least one soft key is selected, a touch pad for changing a display method of at least one of the first image, the second image, the input window, the output window, and the at least one soft key and comprising a plurality of keys for inputting text data.

BRIEF DESCRIPTION OF THE DRAWINGS

The details of one or more implementations are set forth in the accompanying drawings and the description below. In the entire description of this document, like reference numerals represent corresponding parts throughout various figures.

DETAILED DESCRIPTION

Figure 1:
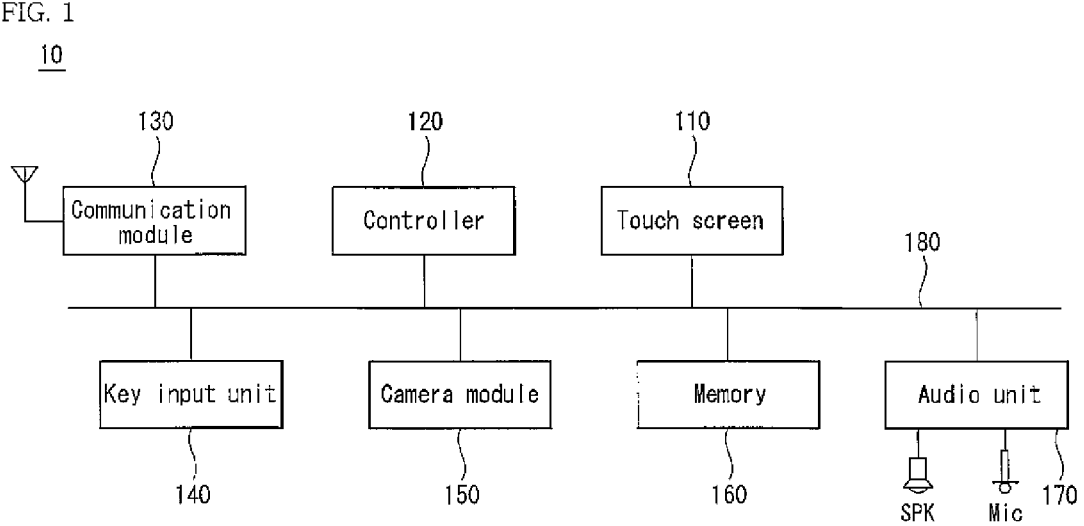
FIG. 1 is a block diagram illustrating a configuration of a mobile communication terminal in an implementation.

These and other objects of this document will become more readily apparent from the detailed description given hereinafter. Hereinafter, implementations will be described in detail with reference to the accompanying drawings. Like reference numerals designate like elements throughout the specification. Further, detailed descriptions of well-known functions and structures incorporated herein may be omitted to avoid obscuring the subject matter of this document.

FIG. 1 is a block diagram illustrating a configuration of a mobile communication terminal in an implementation. Referring to FIG. 1, the mobile communication terminal is described in detail.

A mobile communication terminal 10 in an implementation of this document comprises a touch screen 110, a controller 120, a communication module 130, a key input unit 140, a camera module 150, and a memory 160.

The constituent elements are connected by a bus 180, however a connection element of the constituent elements is not limited thereto, and a part or all of the constituent elements may be connected by an exclusive line thereof.

The mobile communication terminal 10 can be applied to various type terminals such as a bar type terminal, a folder type terminal, and a slide type terminal.

The touch screen 110 is a display device for displaying a state or various information of the mobile communication terminal 10 by a control signal output from the controller 120 and uses, for example a Liquid Crystal Display (LCD). Further, the touch screen 110 simultaneously performs an input function for receiving various information or instructions from a user with a touch method.

The controller 120 controls various constituent elements of the mobile communication terminal 10 and controls general operations of the mobile communication terminal 10. The controller 120 is also used as a processor.

The communication module 130 transmits and receives sound data, image data, and text data by interfacing a communication network and the controller 120 and performs a communication function such as message transmission and reception, audio dedicated communication/video call, and text data transmission and reception together with audio dedicated communication/video call in the mobile communication terminal 10.

Hereinafter, in this document, text data comprise various characters, numerals, special characters, figures, and symbols and may comprise various images that can be provided and used like a text as images standardized and commonly used in order to express an idea or emotion.

The communication network comprises a line switching network and a packet switching network and comprises an IP-based network according to a next generation mobile communication standard such as the 3rd Generation Partnership Project (3GPP), thereby providing a communication path required for receiving an video call service, an Instant Message Service for transmitting and receiving text data, and various session-based multimedia services as well as an audio dedicated communication service in the mobile communication terminal 10.

The key input unit 140 is a device for receiving various information or instructions from the user and comprises an input device such as a keypad comprising various numeric keys, direction keys, and function keys.

The camera module 150 comprises an image forming element such as a Charge Coupled Device (CCD) sensor and uses a digital still video camera that can photograph a still picture and a moving picture. A CCD of the camera module 150 converts an optical signal of a subject to an electrical signal (i.e. image forming signal) and applies the converted signal to the controller 120. The camera module 150 may use a complementary Metal Oxide Semiconductor sensor (CMOS) chip, instead of the CCD. The camera module 150 may use a plurality of camera modules.

The memory 160 comprises a non-volatile memory for storing a program and data required for performing various functions providing in the mobile communication terminal 10 and a volatile memory for temporarily storing various data generating according to operation of the mobile communication terminal 10.

Particularly, the memory 160 stores various programs necessary for displaying various data comprising text and image information on the touch screen 110 with a preset method in the non-volatile memory in order to provide an video call service of the mobile communication terminal 10.

Referring to FIG. 1, a method of controlling the mobile communication terminal 10 is described hereinafter. Hereinafter, video call comprises a video conference in which three or more persons participate at the same time and a case in which one user individually performs much video call with each of many other parties' terminals.

Further, the mobile communication terminal 10 further comprises an audio unit 170 for processing a sound signal that is input to or output from the mobile communication terminal 10, a speaker SPK connected to the audio unit 170 to output a sound signal processed in the audio unit 170, and a microphone (MIC) for converting a sound from the outside to a sound signal and inputting the sound signal to the audio unit 170. The speaker SPK may use a plurality of speakers comprising an external speaker.

FIGS. 2*a* to 2*d* show an example of a screen for transmitting text data displayed on the touch screen 110 of the mobile communication terminal 10, while performing a video call, according to a method of controlling the mobile communication terminal in an implementation.

Figure 2A:
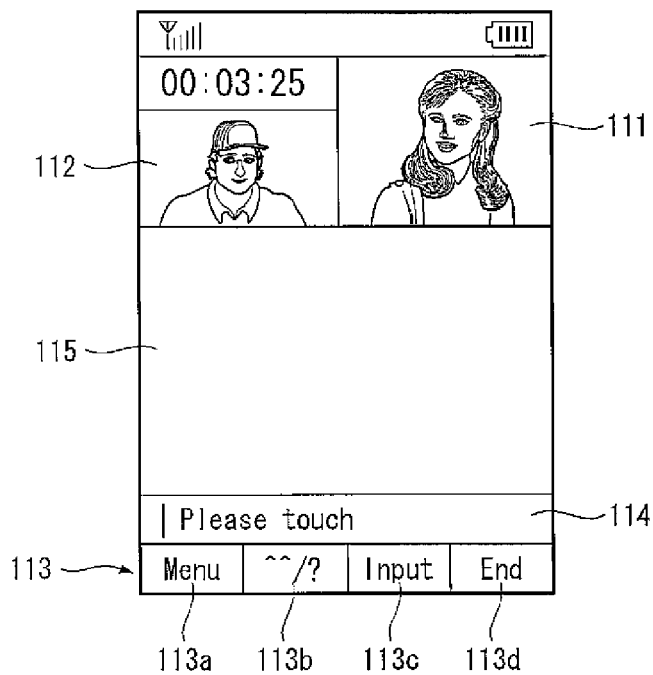
FIGS. 2a to 2d are diagrams illustrating a method of controlling a mobile communication terminal in an implementation.

Referring to FIG. 2*a*, when a video chatting function for receiving or transmitting text data is started using, for example an Instant Message Service while performing a video call, the controller 120 controls the touch screen 110 to display another party's image 111 received from another party's terminal through the communication module 130 and a user image acquired from the camera module 150 or an image stored in the memory 160 to replace the images at one side, for example at the left side and the right side of the upper side of the touch screen 110. As the other party's image 111 and the user image 112 are disposed at one side of the touch screen 110, available space of the touch screen 110 can be maximized.

Further, at least one soft key 113 for controlling the mobile communication terminal 10 in connection with the video call and video chatting is displayed at the other side, for example at the lower end of the touch screen 110.

At least one soft key 113 comprises, for example a menu key 113*a* for entering a menu structure for displaying a list of various functions providing in the mobile communication terminal 10 such as various functions for controlling environment of the mobile communication terminal 10 according to video chatting while performing a video call, a symbol key 113*b* for selecting and transmitting a special character or several symbols such as a comparatively simply symbolized figure according to various theme in order to express user emotion or thinking, an input key 113*c* for popping up a touch pad to be described later in order to input text data, and an end key 113*d* for ending video chatting while performing a video call.

Further, an input window 114 for displaying the input text data is displayed at the upper side of the at least one soft key 113. In order to display the touch pad, the user can touch, for example the input window 114, and enable touch screen 110 to display a guide, such as 'Please touch,' for inducing a touch of the input window 114 on the input window 114 on a screen before the touch pad is displayed.

At any one side of the touch screen 110, for example at the upper side of the user image 112, information, such as a communication duration time, another party's phone number, and the stored other party's name when the other party's phone number is stored in the mobile communication terminal 10, related to video call, can be displayed.

Figure 2B:
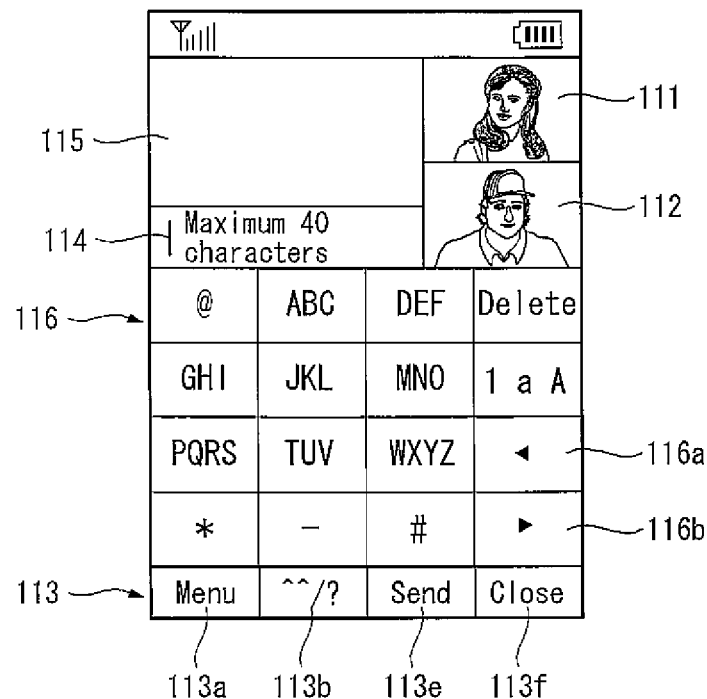

Referring to FIG. 2*b*, when the user touches and selects, for example the input key 113*c* among the soft keys 113 or touches and selects the input window 114 as described above, a touch pad 116 for inputting text data can be displayed.

The touch pad 116 comprises character keys such as a Korean language or an English language, numeric keys, and function keys for assisting the input. For example, the touch pad 116 may comprise direction keys (116*a*, 116*b*) or a delete key for deleting and correcting an existing input text by scrolling to the front and rear a text input through the character keys, the numeric keys, and the function keys and displayed on the input window 114. Further, the touch pad 116 may comprise various function keys for changing a kind of characters that can be input through the touch pad 116.

In order to secure space for displaying the touch pad 116, the controller 120 controls to vertically dispose the other party's image 111 and the user image 112 at one side, for example at an upper right side of the touch screen 110, to display the output window 115 at the left side thereof, and to display the input window 114 at the lower end of the output window 115.

The output window 115 performs a function of displaying text data input by the user and transmitted to the other party's terminal and text data received from the other party's terminal.

Further, when the touch pad 116 is displayed, at least one of soft keys displayed at a lower end of the touch screen 110 may be changed to a soft key for performing other functions. For example, an input key 113*c* for popping up the touch pad 116 is changed to a send key 113*e* for transmitting text data input through the touch pad 116 to the other party's terminal, and an end key 113*d* for ending a video chatting function is changed to a close key 113*f* for deleting the touch pad 116 on the touch screen 110.

Figure 2C:
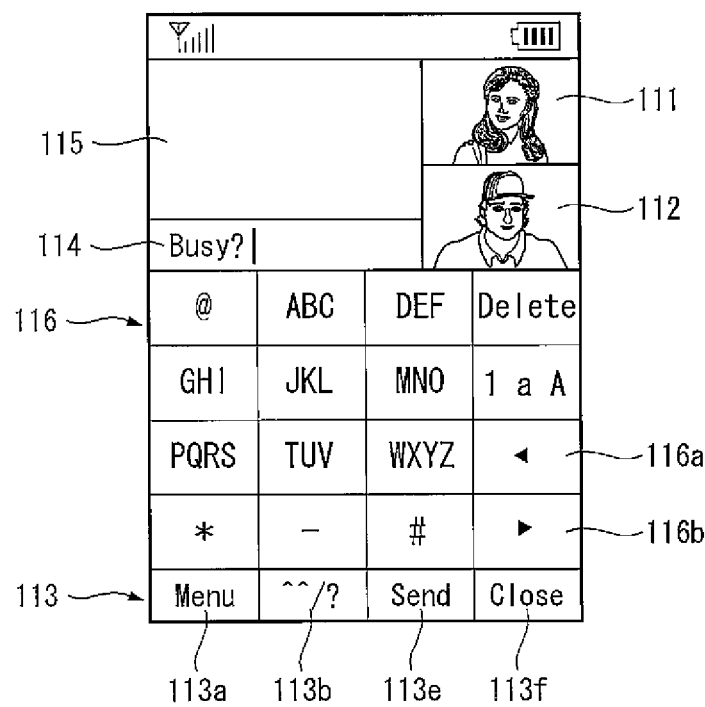

Referring to FIG. 2*c*, a text in which the user inputs through the touch pad 116 is displayed on the input window 114. In this state, when the user touches and selects a send key 113*e*, the input text is transmitted to the other party's terminal.

Figure 2D:
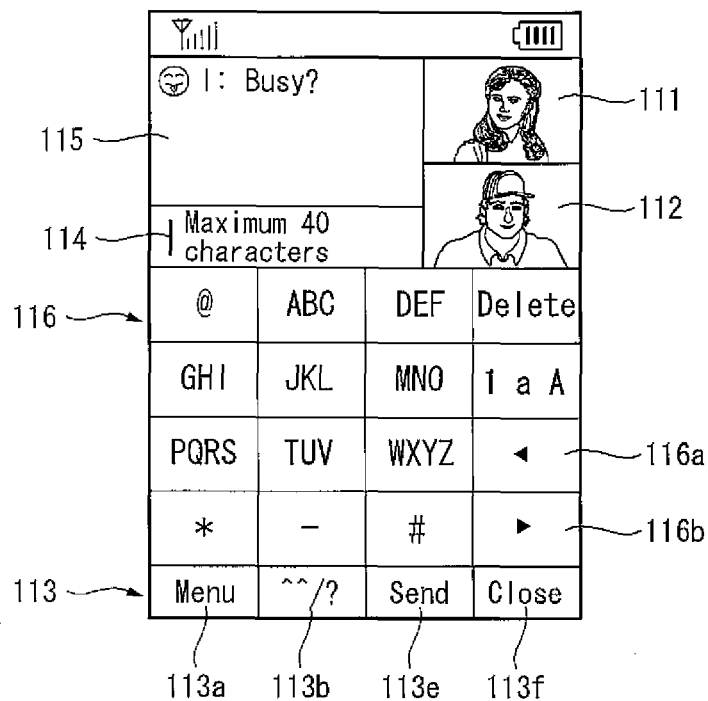

Further, referring to FIG. 2*d*, the transmitted text is displayed on the output window 115. In this case, the controller 120 controls to distinguishably display text data transmitted by the user and text data received from the other party's terminal using a distinguishable label such as a text, symbol, or image for displaying each of a user and another party in the text data displayed on the output window 115.

In the preceding example, the text exchange is between participants of the video call. Thus, the participants may have a private text discussion while conducting a video conference with at least one other participant. In other embodiments, the text exchange may be with a party who is not a participant in the video call/conference. Thus, a party can simultaneously communicate with a selected person while participating in a video call/conference with other parties.

FIGS. 3*a* to 3*e* show an example of a screen for transmitting text data displayed on the touch screen 110 of the mobile communication terminal 10, while performing a video call, according to a method of controlling the mobile communication terminal in another implementation.

Figure 3A:
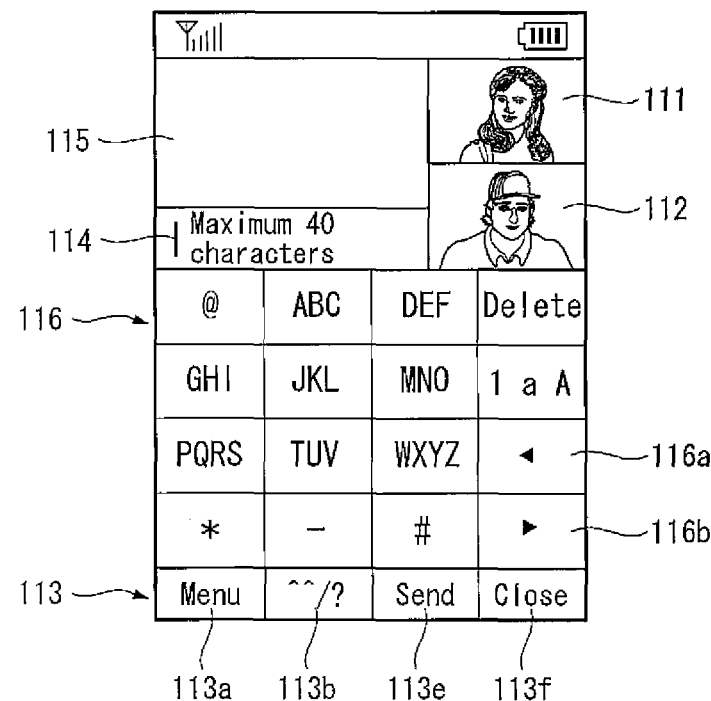
FIGS. 3a to 3e are diagrams illustrating a method of controlling a mobile communication terminal in another implementation.

Referring to FIG. 3*a*, the user image 112 and the other party's image 111 are disposed at the right upper end of the touch screen 110, the output window 115 and the input window 114 are displayed at the left side thereof, and a touch pad 116 for inputting text data is displayed at the lower side thereof.

Figure 3B:
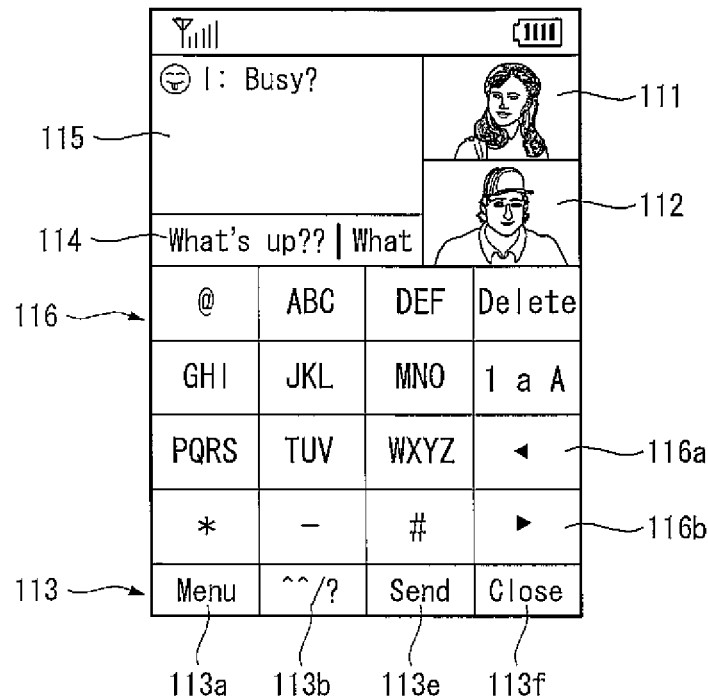

The user inputs text data using the touch pad 116, and the input text data are displayed on the input window 114, as shown in FIG. 3b, when the user touches and selects the send key 113e, the text data displayed on the input window 114 are transmitted to the other party's terminal and displayed on the output window 115.

Figure 3C:
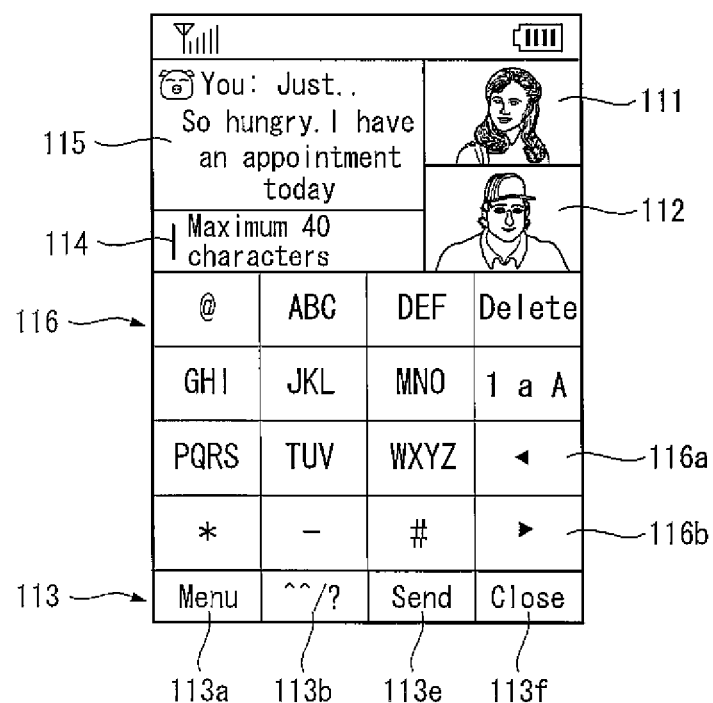

Referring to FIG. 3c, text data received from the other party's terminal are also displayed on the output window 115, and text data transmitted and received by the user and the other party are distinguishably displayed using a symbol and a text ('I' or 'You').

As video chatting is performed by the user and the other party, an amount of the transmitted and received text data increases, whereby it is difficult to check the transmitted and received text data through a limited size of output window 115.

Figure 3D:
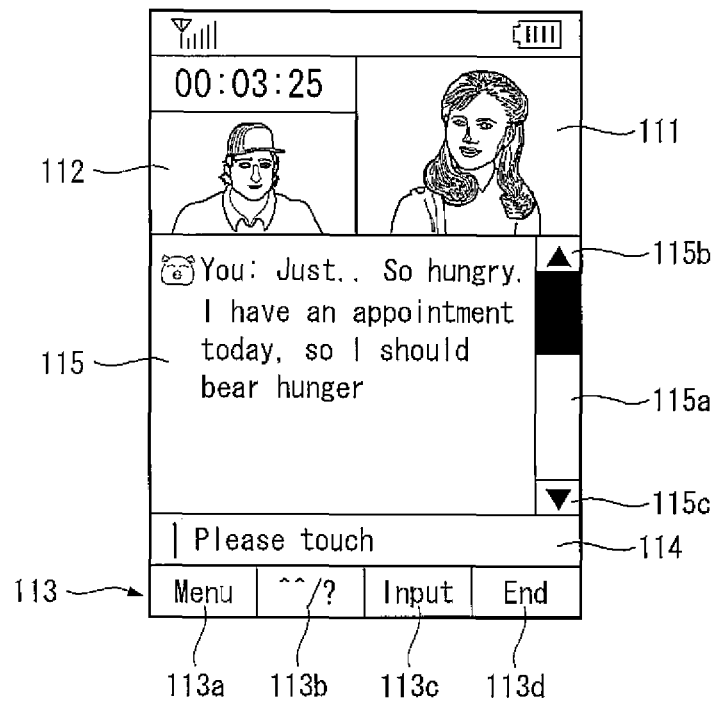

Therefore, in FIG. 3c, when the user touches and selects a random area of the output window 115, the displayed touch pad 116 is removed from the touch screen 110, as shown in FIG. 3d, and while a size of the output window 115 is enlarged, the output window 115 is displayed in an area in which the touch pad 116 is deleted, whereby the user can more easily check the transmitted and received text data.

Further, the output window 115 may have a scroll bar 115a at the right side thereof to vertically scroll the transmitted and received text data. Further, the scroll bar 115a further comprises direction keys (115b, 115c) for easily scrolling text data.

Figure 3E:
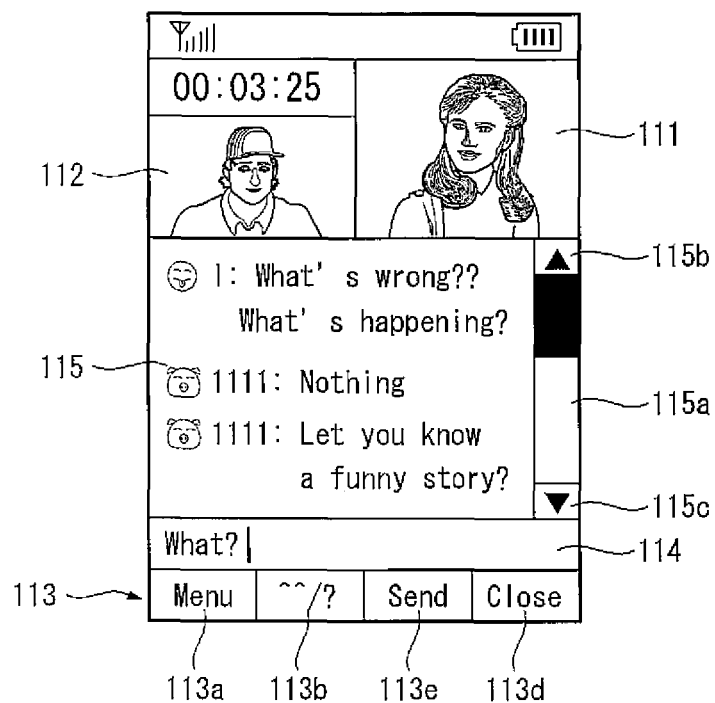

When the user touches, for example the upper direction key 115b, as shown a FIG. 3d, the transmitted and received data are scrolled in an upper direction, as shown in FIG. 3e and the previously transmitted and received text data are displayed on the output window 115.

Figure 4A:
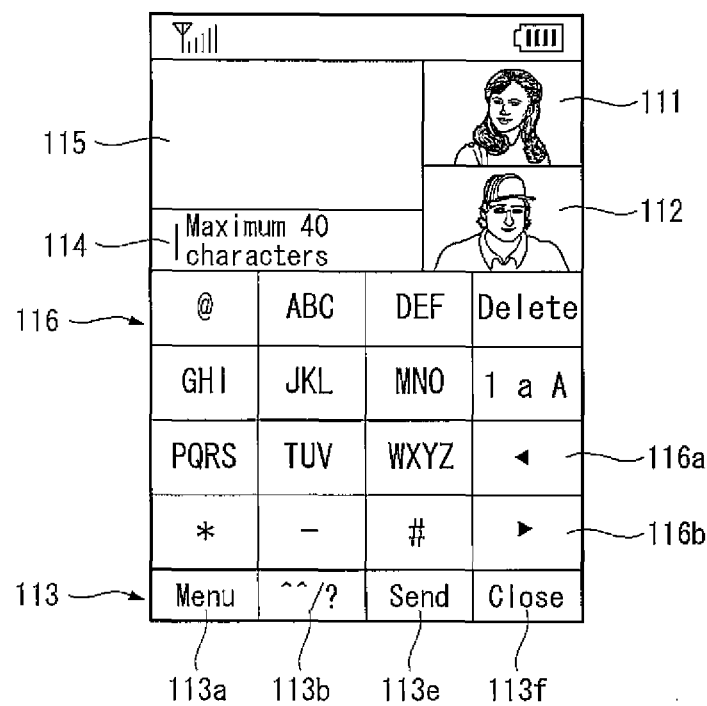
FIGS. 4a to 4c are diagrams illustrating a method of controlling a mobile communication terminal in another implementation.
Figure 4B:
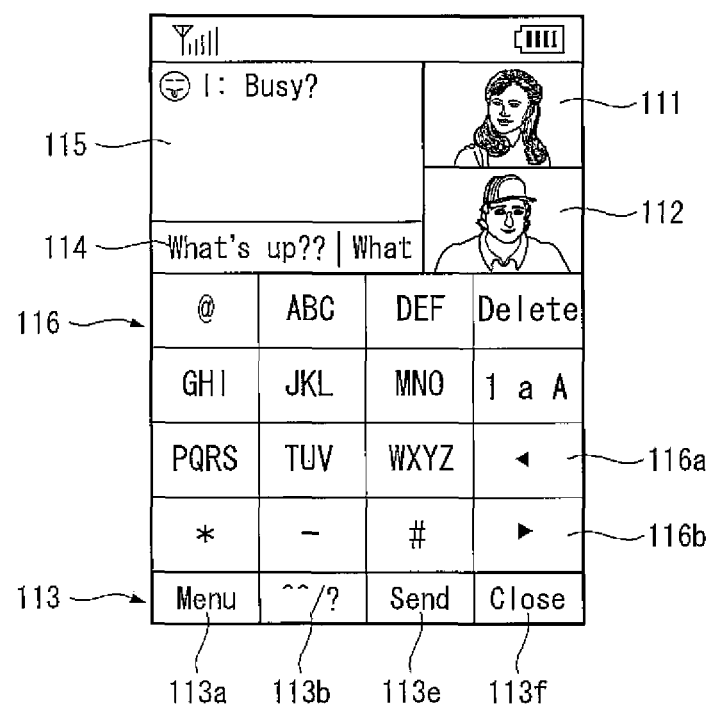
Figure 4C:
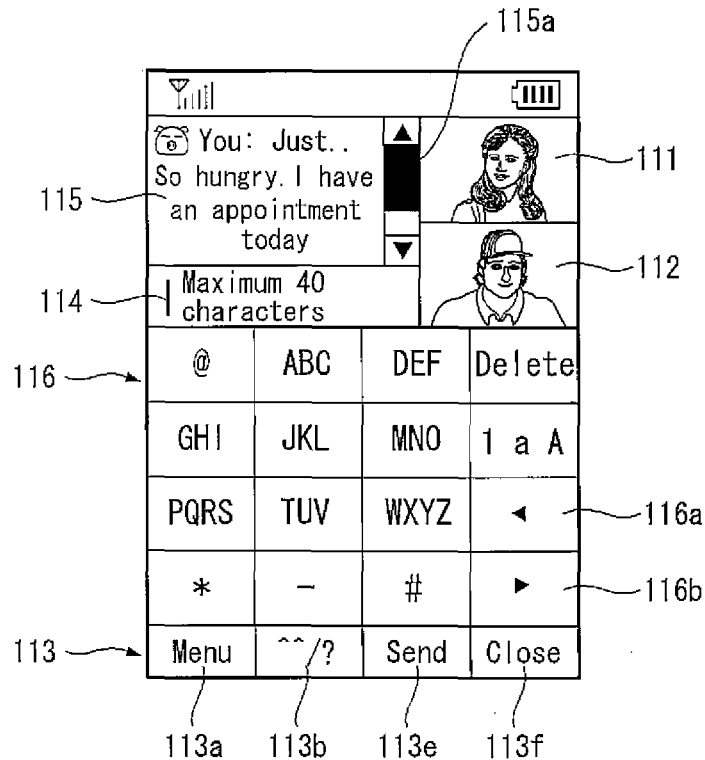

FIGS. 4a to 4c show an example of a screen for transmitting text data displayed on the touch screen 110 of the mobile communication terminal 10, while performing a video call, according to a method of controlling the mobile communication terminal in another implementation.

Referring to FIG. 4a, the user image 112, the other party's image 111, the output window 115, and the input window 114 are displayed on the touch screen 110, and the touch pad 116 for inputting text data is displayed at the lower side thereof.

Text data in which the user inputs using the touch pad 116 is displayed on the input window 114, as shown in FIG. 4b, and text data displayed on the input window 114 are transmitted to the other party's terminal by selection of the send key 113e by the user and displayed on the output window 115.

Referring to FIG. 4c, because text data received from the other party's terminal and text data input and transmitted by the user are displayed on the output window 115, all text data may not be displayed within an area allocated to the touch screen.

Therefore, the controller 120 controls the touch screen 110 to display a scroll bar 115a in some area of the output window and vertically scroll text data displayed on the output window 115.

The displayed scroll bar 115a performs only a function for displaying that text data transmitted and received before or after text data displayed on a current screen of the output window 115 further exist, and when the user touches an area of the scroll bar in order to actually scroll the text data, a separate direction key may be popped up and the popped up direction key may be used. In this case, because an area for displaying the direction key is fully secured, when a touch operation is performed, interference can be minimized. This is described in detail later.

FIGS. 5a to 5e show an example of a screen for transmitting text data displayed on the touch screen 110 of the mobile communication terminal 10, while performing a video call, according to a method of controlling the mobile communication terminal in another implementation.

Figure 5A:
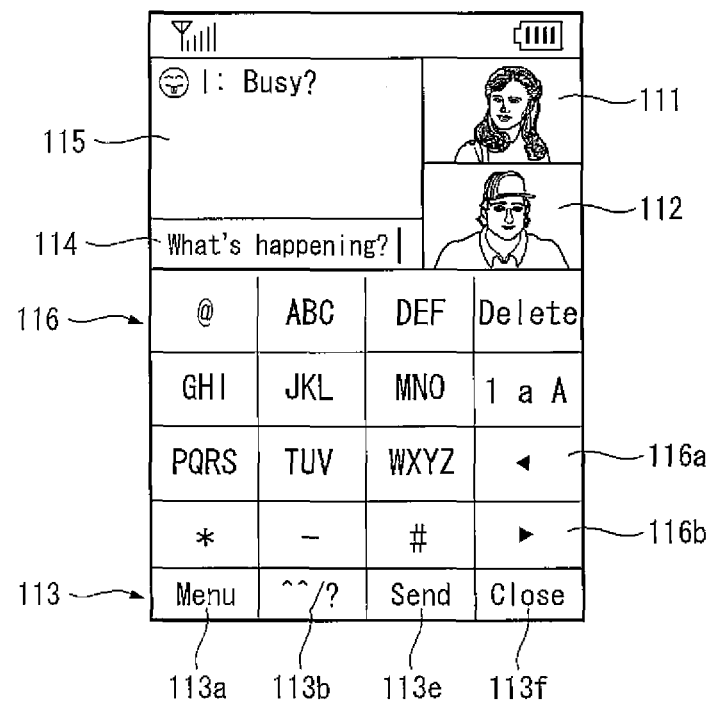
FIGS. 5a to 5e are diagrams illustrating a method of controlling a mobile communication terminal in another implementation.

Referring to FIG. 5a, the user image 112 and the other party's image 111 are disposed at the right upper end of the touch screen 110, the output window 115 and the input window 114 are displayed at the left side thereof, and the touch pad 116 for inputting text data is displayed at the lower side thereof.

The user inputs text data using the touch pad 116, and thus the input text data are displayed on the input window 114.

When the input text data are displayed on the input window 114, the user can laterally scroll text data displayed on the input window 114 using direction keys (116a, 116b) provided on the touch pad 116, thereby correcting or adding a text.

Figure 5B:
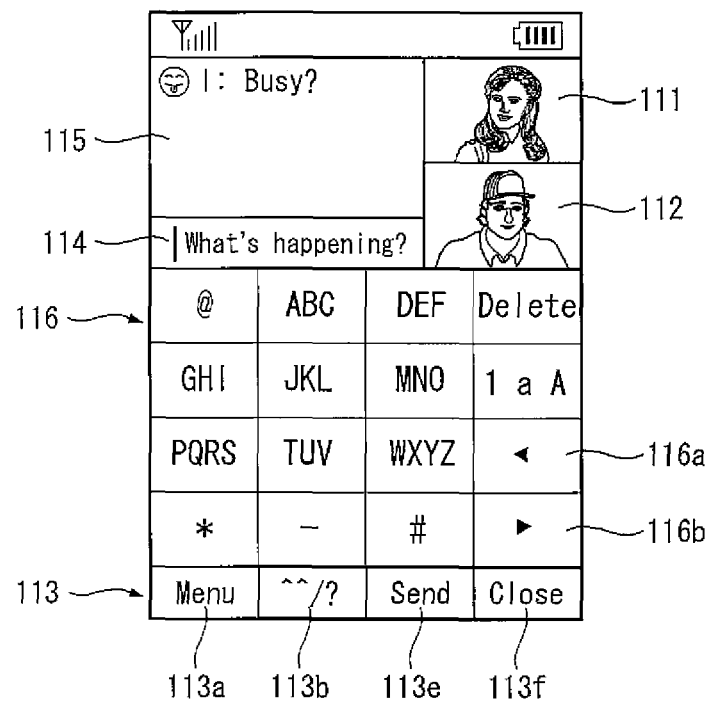

For example, when the user touches six times the left direction key 116a, a cursor moves six spaces to the left within the input window 114, as shown in FIG. 5b, whereby new text data can be input and the previously input text data can be corrected in a location at which the corresponding cursor is positioned.

Figure 5C:
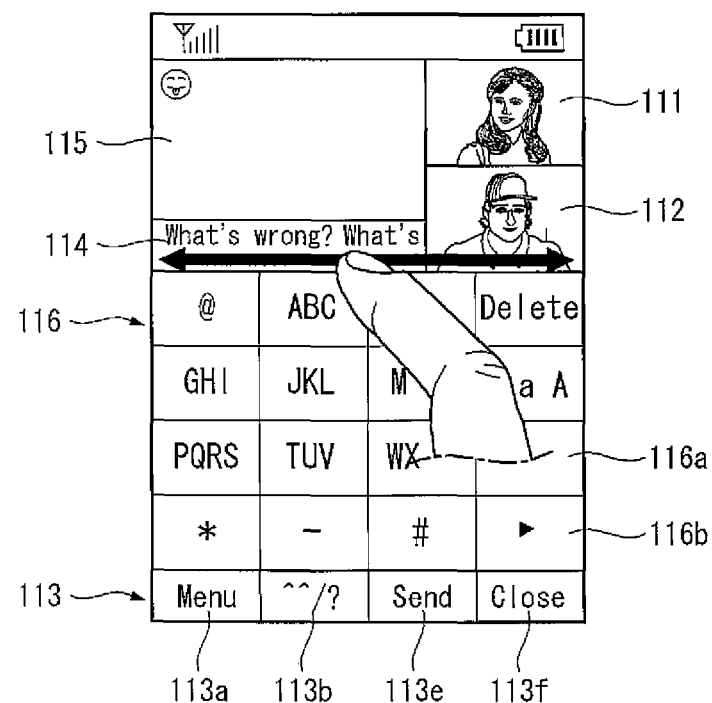

Further, as shown in FIG. 5c, the user can check the front or the rear of a sentence by laterally scrolling text data displayed on the input window with a method of dragging the input window 114 to the left side and the right side.

Figure 5D:
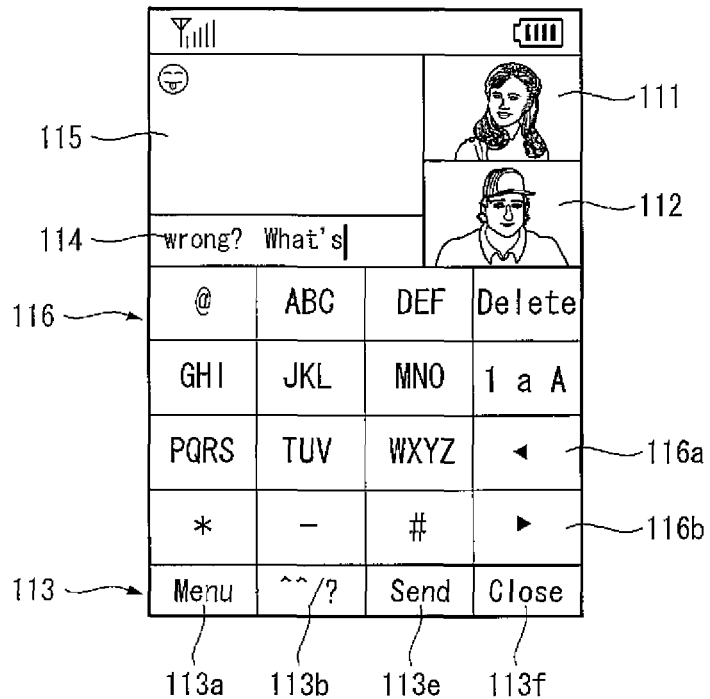

When the user touches, for example, three times the right direction key 116b, as shown in FIG. 5c, the cursor is moved to a position shown in FIG. 5d.

Figure 5E:
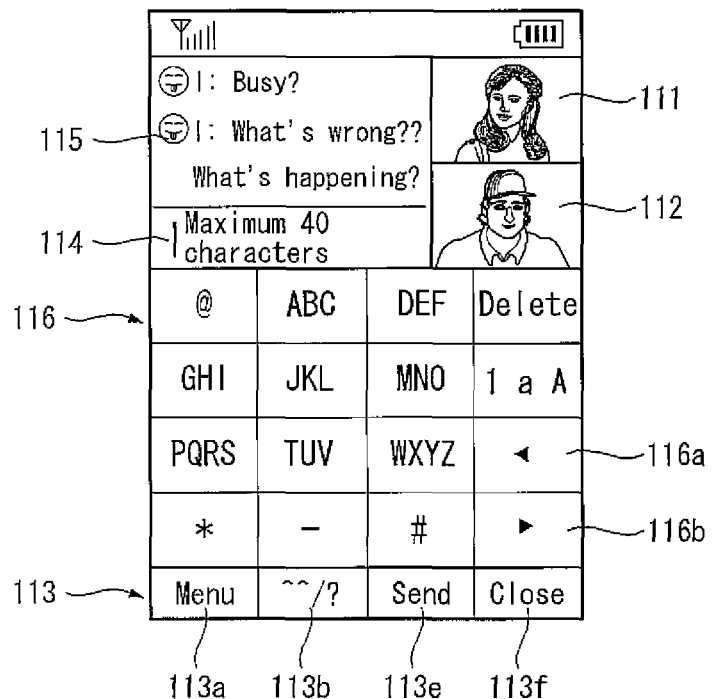

Therefore, as shown in FIG. 5d, in a state where text data are input, when the user touches and selects the send key 113e, text data displayed on the input window 114 are transmitted to the other party's terminal regardless of a position of the cursor and displayed on the output window 115, as shown in FIG. 5e.

Figure 6A:
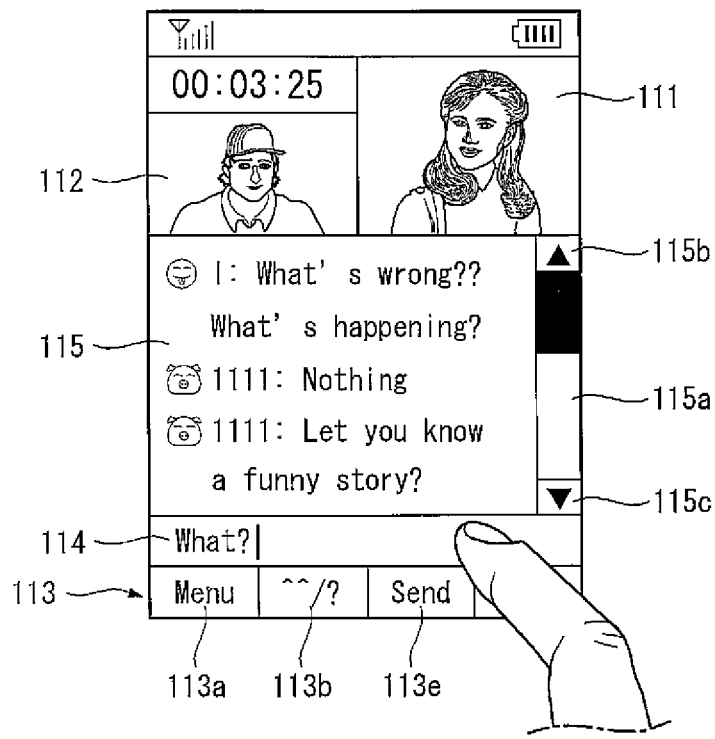
FIGS. 6a to 6c are diagrams illustrating a method of controlling a mobile communication terminal in another implementation.
Figure 6B:
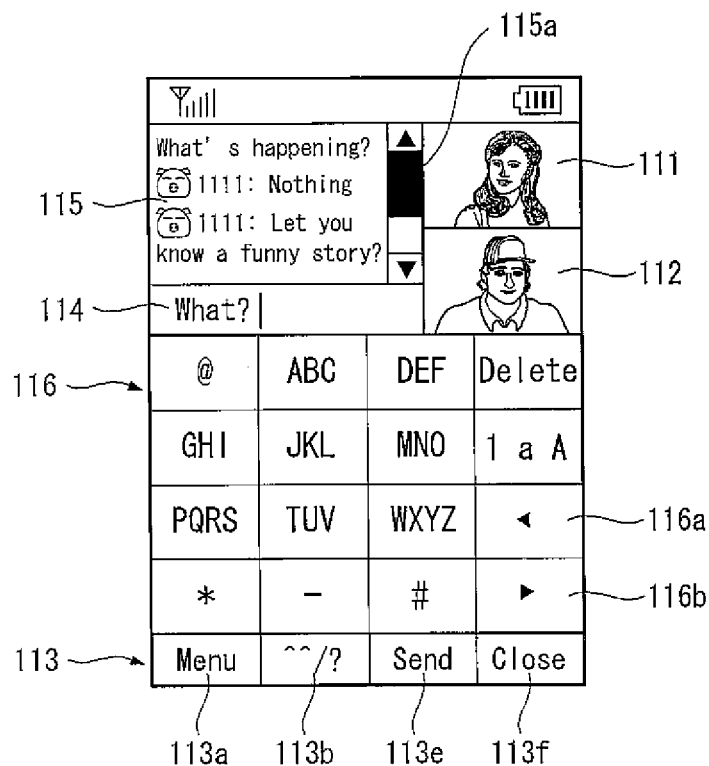
Figure 6C:
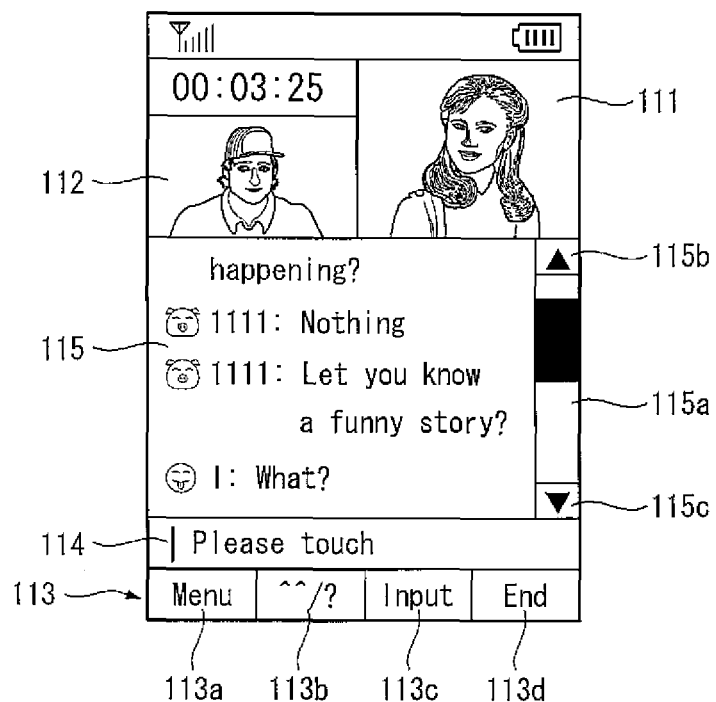

FIGS. 6a to 6c show an example of a screen for transmitting text data displayed on the touch screen 110 of the mobile communication terminal 10, while performing a video call, according to a method of controlling the mobile communication terminal in another implementation.

FIG. 6a shows an example in which the touch pad 116 is deleted and the output window 115 is enlarged and displayed when the user touches, for example the output window 115 or a close key 113f after inputting text data.

In this case, even if the touch pad 116 is deleted, the already input text data are displayed on the input window 114, when the user touches, for example the input window 114, the touch pad 116 is again displayed and the output window 115 is reduced, as shown in FIG. 6b.

Further, in a state where the touch pad 116 is displayed, as shown in FIG. 6b or in a state where the touch pad 116 is deleted, as shown in FIG. 6a, when the user touches the send key 113e, text data displayed on the input window 114 are transmitted to the other party's terminal and displayed on the output window 115, as shown in FIG. 6C.

In a state where the touch pad 116 is deleted, as shown in FIG. 6a, when the user touches the send key 113e, after text data displayed on the input window 114 are transmitted to the other party's terminal and displayed on the output window 115, the send key 113e among the soft keys 113 is converted to the input key 113c for displaying the touch pad 116, as shown in FIG. 6C.

FIGS. 7a to 7d show an example of a screen for transmitting text data displayed on the touch screen 110 of the mobile communication terminal 10, while performing a video call, according to a method of controlling the mobile communication terminal in another implementation.

Figure 7A:
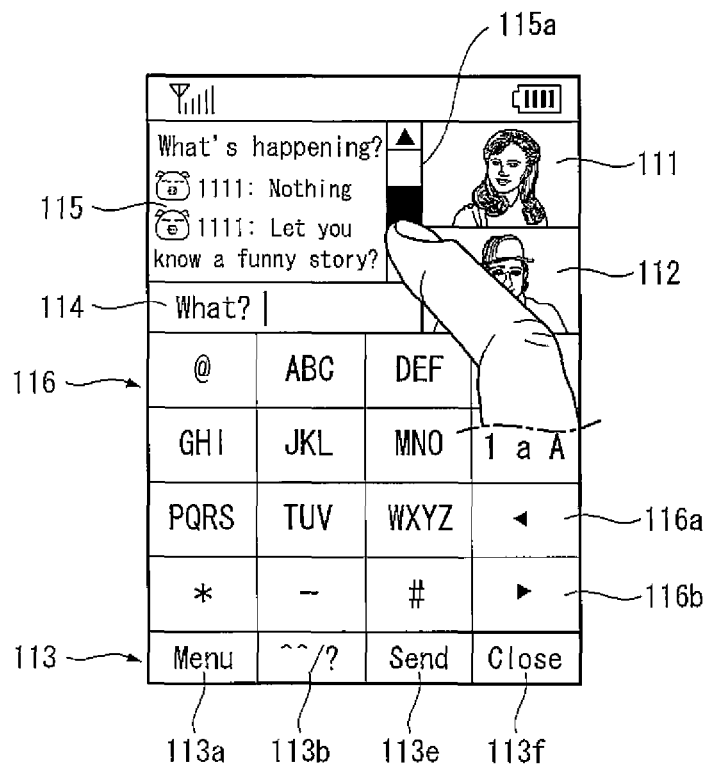
FIGS. 7a to 7d are diagrams illustrating a method of controlling a mobile communication terminal in another implementation.

Referring to FIG. 7a, the user image 112 and the other party's image 111 are disposed at the right upper end of the touch screen 110, the output window 115 and the input window 114 are displayed at the left side thereof, and the touch pad 116 for inputting text data is displayed at the lower side thereof.

Due to much amount of the transmitted and received text data, when all of the transmitted and received text data cannot be displayed in the display area of the output window 115, the scroll bar 115a can be displayed at the right side of the output window 115.

Figure 7B:
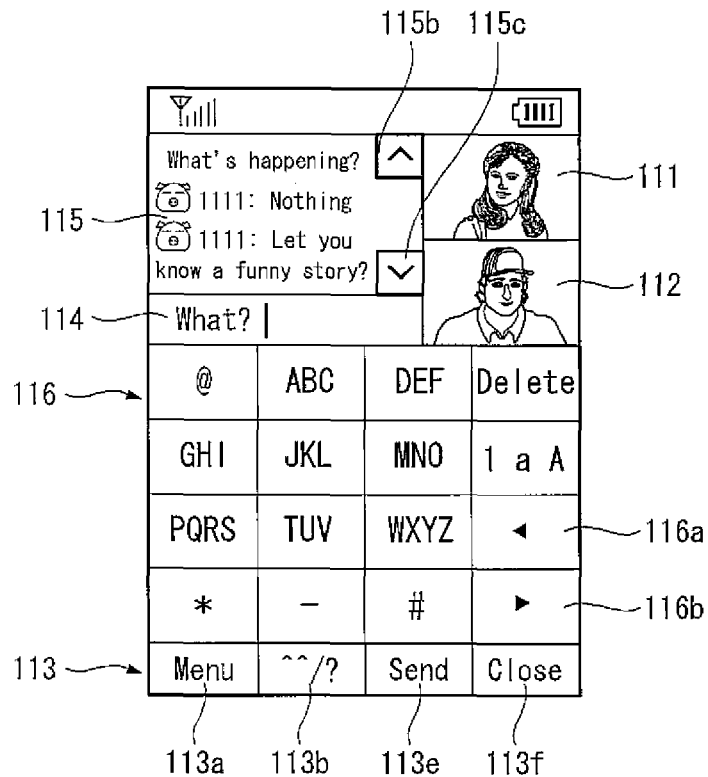

In this case, when the user touches an area in which a scroll bar 115a is displayed, direction keys (115b, 115c) are popped up and displayed within or around the output window 115, as shown in FIG. 7b.

Figure 7C:
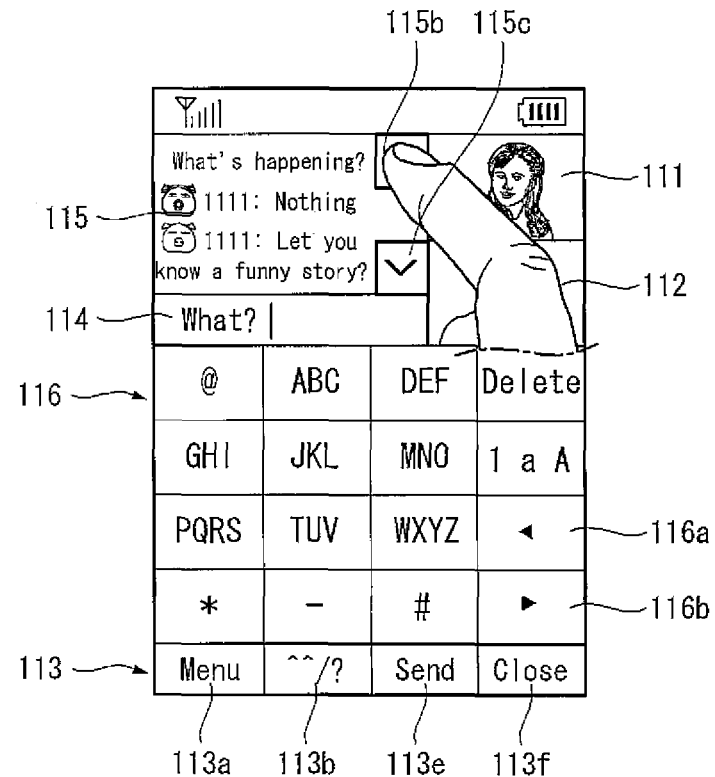
Figure 7D:
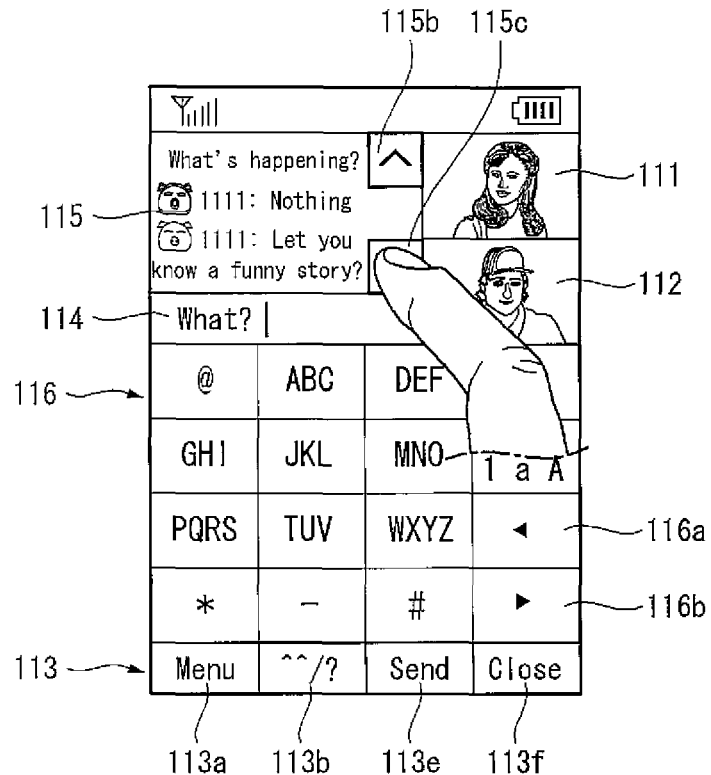

Therefore, the user can scroll text data displayed on the output window 115 in an upper direction by touching the upper direction key 115b, as shown in FIG. 7c or scroll text data displayed on the output window 115 in a lower direction by touching the lower direction key 115c, as shown in FIG. 7d.

FIGS. 8a to 8d show an example of a screen for transmitting text data displayed on the touch screen 110 of the mobile communication terminal 10, while performing a video call, according to a method of controlling the mobile communication terminal in another implementation.

Figure 8A:
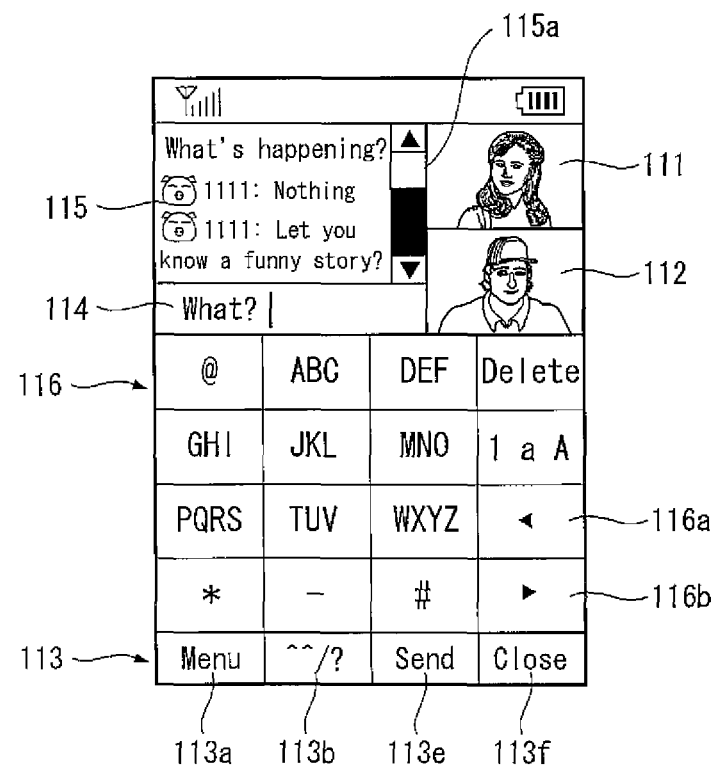
FIGS. 8a to 8d are diagrams illustrating a method of controlling a mobile communication terminal in another implementation.

Referring to FIG. 8a, the user image 112 and the other party's image 111 are disposed at the right upper end of the touch screen 110, the output window 115 and the input window 114 are displayed at the left side thereof, and the touch pad 116 for inputting text data is displayed at the lower side thereof.

Due to much amount of the transmitted and received text data, when all of the transmitted and received text data cannot be displayed in the display area of the output window 115, the scroll bar 115a can be displayed at the right side of the output window 115.

In this case, when the user touches for an extended time for example, an upper area 115b of the output window 115, text data displayed on the output window 115 are scrolled in an upper direction.

Further, when the user touches for an extended time for example, an internal area 115c of the output window 115, text data displayed on the output window 115 are scrolled in a lower direction.

Figure 8B:
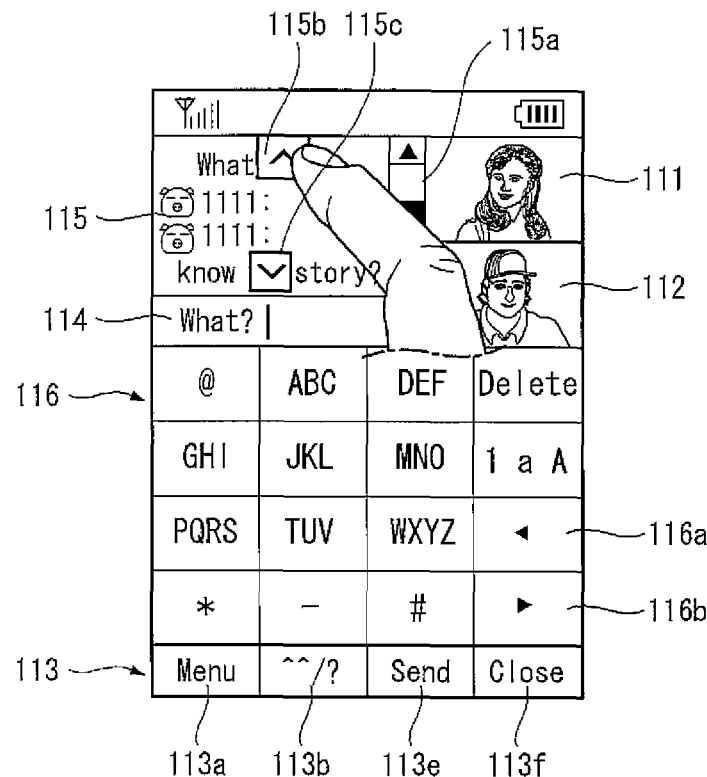
Figure 8C:
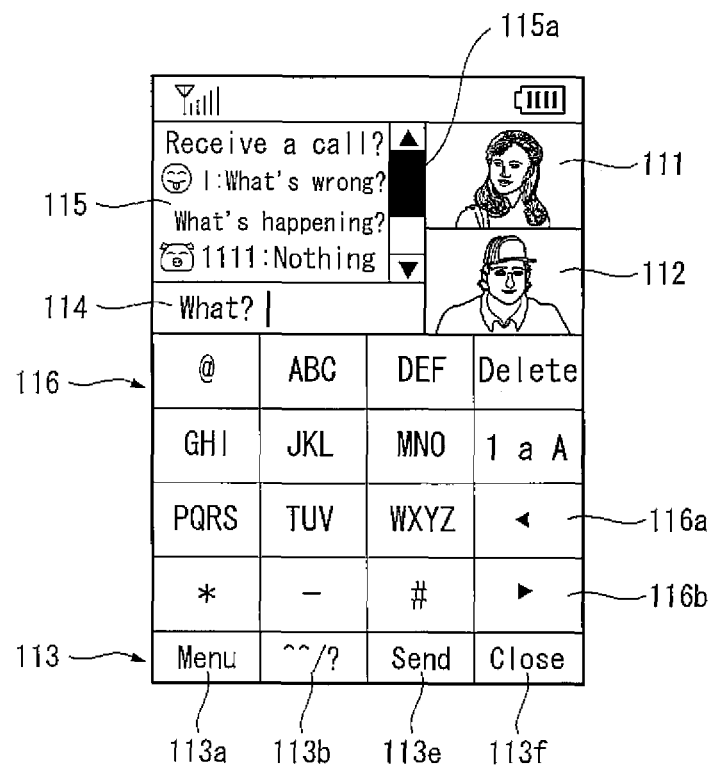
Figure 8D:
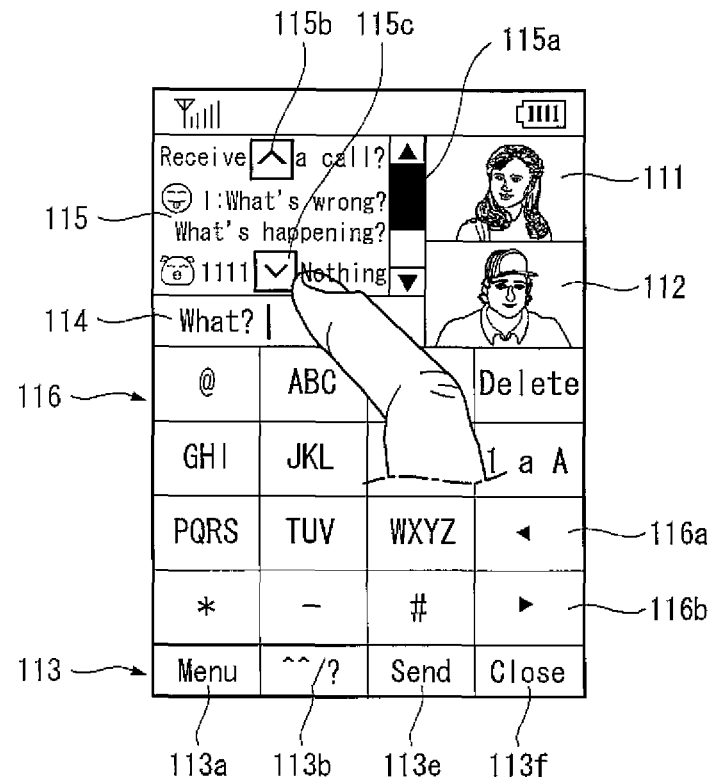

Further, in this case, when text data are scrolled to the upper side by user touch, an upper direction symbol 115b is shown in FIG. 8b or a lower direction symbol 115c is shown in FIG. 8c and a currently displayed direction is displayed within or around the output window 115, thereby visually notifying the user of a scroll direction. Further, in this case, display of an upper or lower direction can translucently be performed.

FIGS. 9a to 9d show an example of a screen for transmitting text data displayed on the touch screen 110 of the mobile communication terminal 10, while performing a video call, according to a method of controlling the mobile communication terminal in another implementation.

Figure 9A:
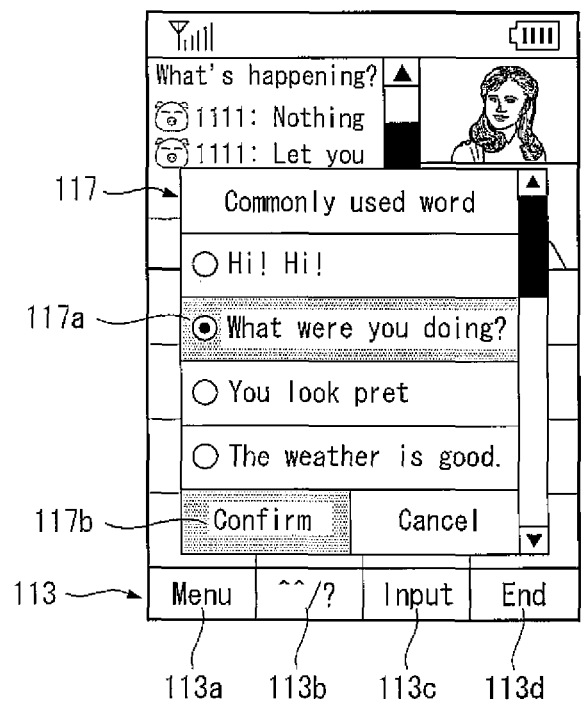
FIGS. 9a to 9d are diagrams illustrating a method of controlling a mobile communication terminal in another implementation.

Referring to FIG. 9a, when the user executes, for example a commonly used word selection function provided in the mobile communication terminal 10 by touching the menu key 113a, the controller 120 controls the touch screen 110 to display a commonly used word list providing screen 117 for displaying a list of commonly used words stored in the memory 160 in, for example a pop-up window form.

The commonly used word selection function may use to provide a generally used phrase in the mobile communication terminal 10, to provide a generally used phrase previously input and stored by the user, or to provide phrases that have been frequently used by the user as a commonly used word.

Further, a display order of phrases displayed in a list of the commonly used word can follow an order of preset or recently used commonly used words or an order of frequently used commonly used words.

The commonly used word list providing screen 117 may comprise a scroll bar for scrolling a screen in order to display a commonly used word that does not displayed on one screen on the screen and a confirmation key 117b for inputting a selected commonly used word 117a or a cancellation key for canceling the selected commonly used word 117a.

When the user touches one commonly used word 117a of commonly used words displayed on the commonly used word list providing screen 117, selection of the commonly used word 117a selected by the touch is displayed at a selection box displayed at the left side or the commonly used word itself is displayed in a reversed color or highlighted, whereby the touched commonly used word is distinguishably displayed from other commonly used words.

Figure 9B:
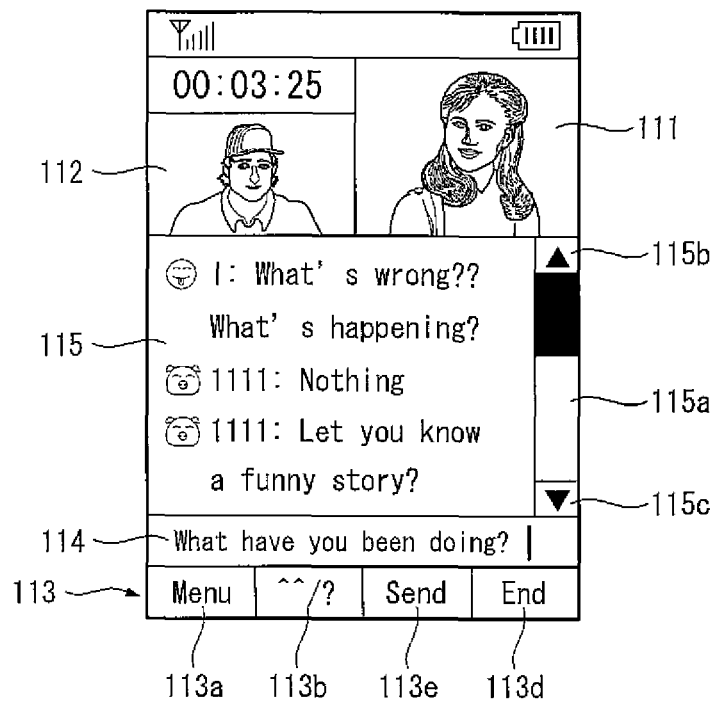

Therefore, when the user touches the confirmation key 117b, the selected commonly used word 117a is input to the mobile communication terminal 10 and displayed on the input window 114, as shown in FIG. 9b.

Figure 9C:
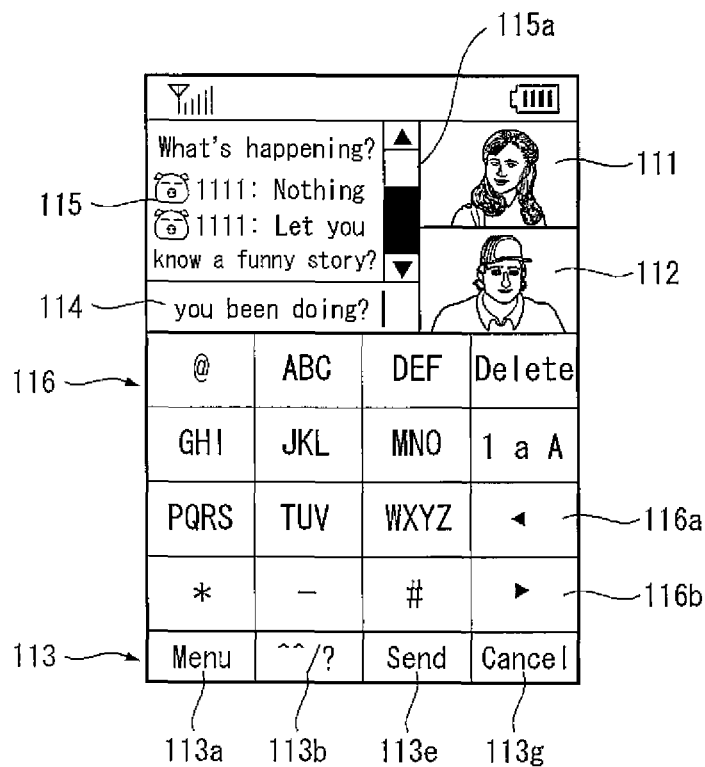

In this case, the user enables touch screen 110 to display the touch pad 116, as shown in FIG. 9c by touching the input window 114, and can correct the input commonly used word or additionally input new text data using the displayed touch pad 116.

Figure 9D:
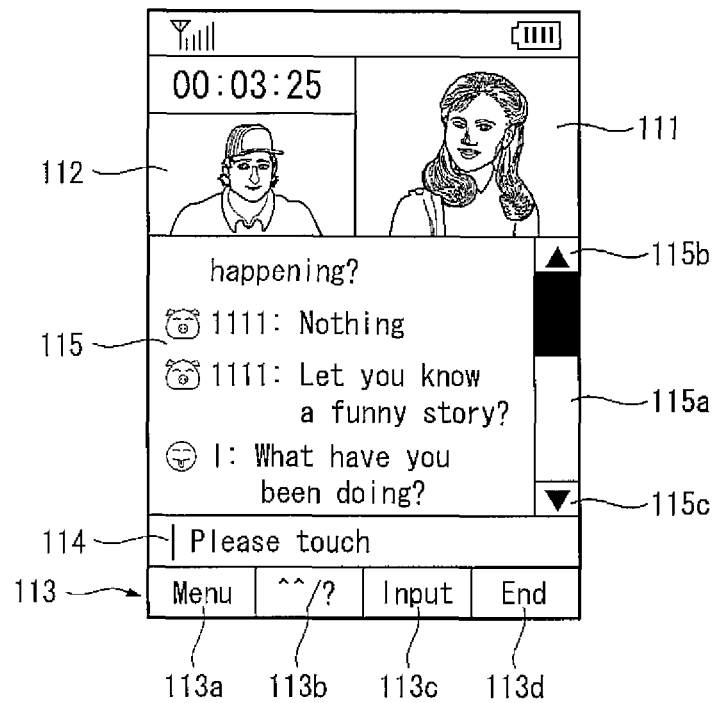

Further, by touching and sending the send key 113e on a screen shown in FIG. 9b or a screen shown in FIG. 9c, the user enables touch screen 110 to transmit text data displayed on the input window 114 to the other party's terminal and to display the text data on the output window 115, as shown in FIG. 9d.

FIGS. 10a to 10d 11a show an example of a screen for transmitting text data displayed on the touch screen 110 of the mobile communication terminal 10, while performing a video call, according to a method of controlling the mobile communication terminal in another implementation.

Figure 10A:
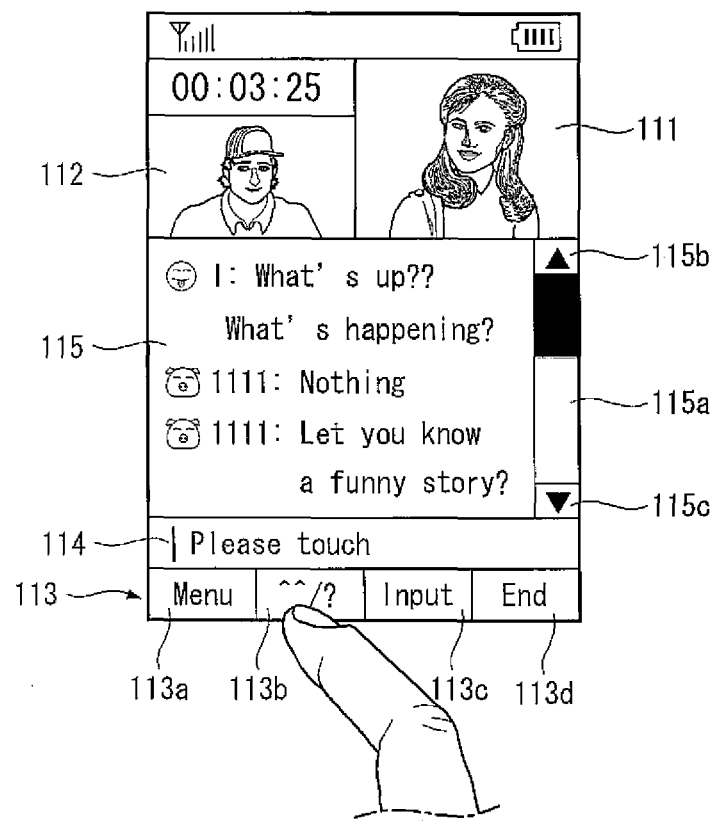
FIGS. 10a to 10e are diagrams illustrating a method of controlling a mobile communication terminal in another implementation.
Figure 10B:
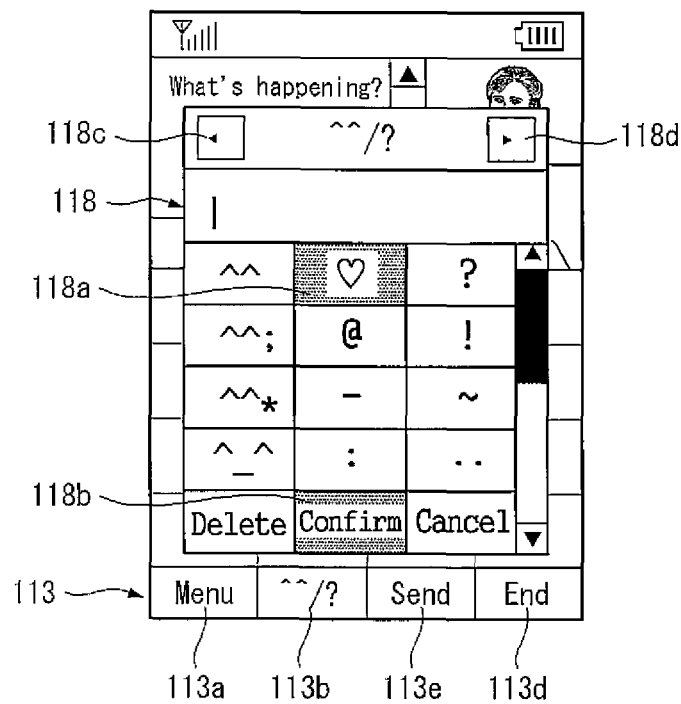

As shown in FIG. 10a, when the user executes, for example a symbol selection function providing in the mobile communication terminal 10 by touching a menu key 113a, the controller 120 controls the touch screen 110 to display a symbol selection screen 118 for displaying various symbols stored in the memory 160 in, for example, a pop-up window form, as shown in FIG. 10b.

The symbol selection screen 118 may be overlaid on the screen shown in FIG. 10a and may be, for example translucently displayed to view a lower screen thereof.

The symbol selection screen 118 displays a generally used special character and symbol and may comprise direction keys (118c, 118d) for converting a category of the displayed symbol, a scroll bar for scrolling a screen in which symbols belonging to the corresponding category are displayed, a confirmation key 118b for inputting the selected symbol 118a, and a cancellation key for canceling the selected symbol 118a.

When the user touches one symbol 118a of symbols displayed on the symbol selection screen 118, the symbol 118a selected by the touch is distinguishably displayed from other symbols with a display method such as reversal and highlight.

Figure 10C:
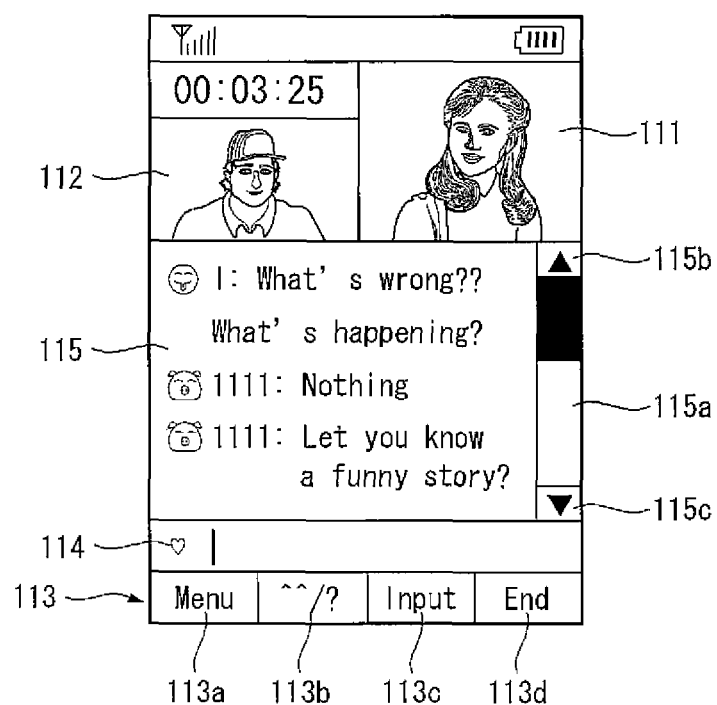

Thereafter, when the user touches the confirmation key 118b, the selected symbol 118a is input to the mobile communication terminal 10 and displayed on the input window 114, as shown in FIG. 10C.

Figure 10D:
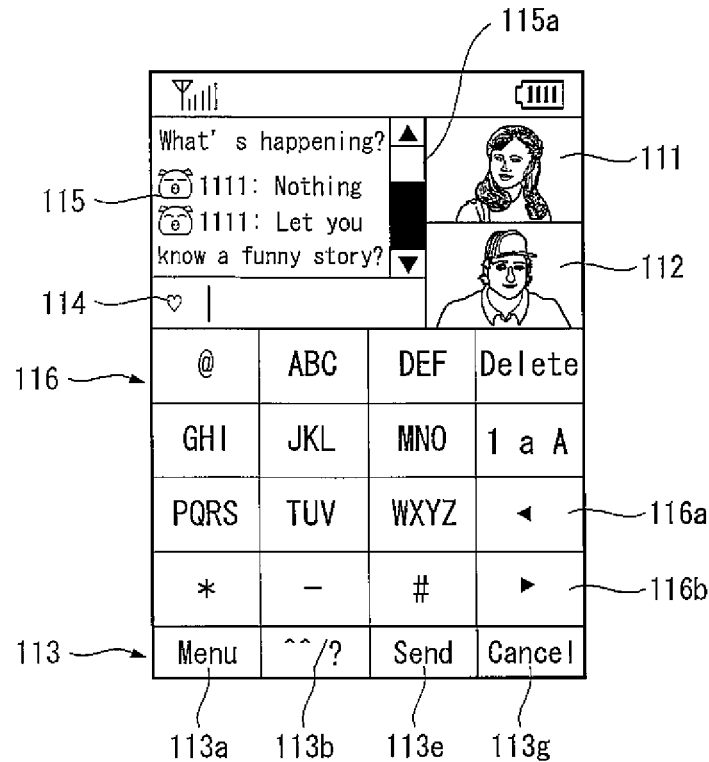

In this case, by touching the input window 114, the user enables touch screen 110 to display the touch pad 116, as shown in FIG. 10D and can additionally input new text data in addition to the input symbol using the displayed touch pad 116.

Figure 10E:
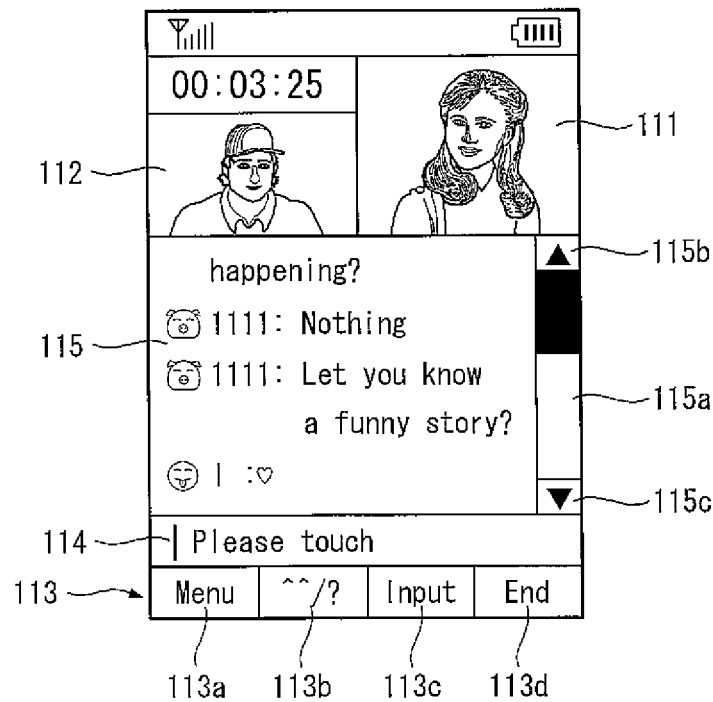

Further, the user enables touch screen 110 to transmit a symbol displayed on the input window 114 to the other party's terminal by touching and selecting the send key 113e on the screen shown in FIG. 10c or the screen shown in FIG. 10d and to display the symbol on the output window 115, as shown in FIG. 10e.

FIGS. 11a to 11e show an example of a screen for transmitting text data displayed on the touch screen 110 of the mobile communication terminal 10, while performing a video call, according to a method of controlling the mobile communication terminal in another implementation.

Figure 11A:
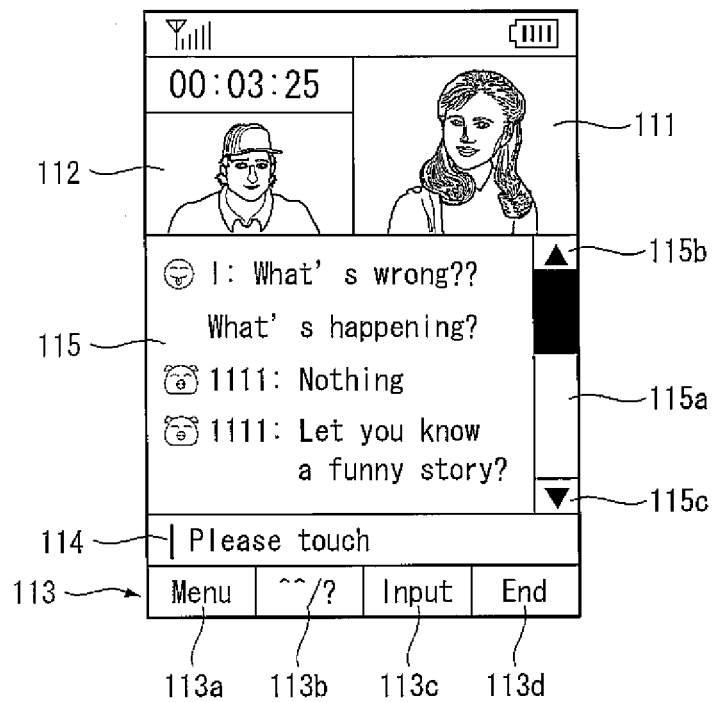
FIGS. 11a to 11e are diagrams illustrating a method of controlling a mobile communication terminal in another implementation.

Referring to FIG. 11a, as a video chatting function is performed while performing a video call, the user image 112 and the other party's image 111 are displayed, and the transmitted text data and the received text data are distinguishably displayed using a label such as a symbol or a text on the output window 115 of the lower end thereof.

By presetting and storing the label for distinguishing the transmitted text data and the received text data in the memory 160 of the mobile communication terminal 10, the label can be automatically applied when performing a video chatting function.

By designating and storing the label for distinguishing the text data with a specific text, symbol, or image in, for example a phone book stored in the memory 160 of the mobile communication terminal 10, when a chatting function with the other party is performed, text data received from another party can be displayed using the designated label.

Further, labels for distinguishing the transmitted text data and the received text may be preset by the user or set by the user while chatting.

Further, a label for displaying text data input and transmitted by the user among labels preset or set by the user while chatting can be transmitted to the other party's terminal and display a text transmitted by the user.

The user can distinguishably display the transmitted text data and the received text data by capturing a currently displaying user image 112 or other party's image 111 or using a label such as an image or a symbol previously stored in the memory 160, instead of using the label for distinguishing the transmitted text data and the received text data.

Figure 11B:
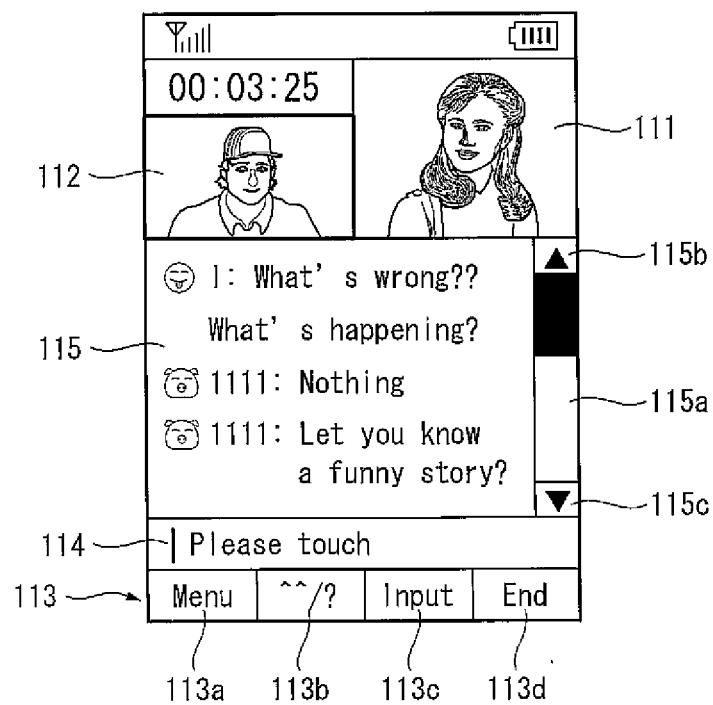

Referring to FIG. 11b, the user can select and capture the user image 112 in order to use as a label for displaying the text data transmitted by the user.

Figure 11C:
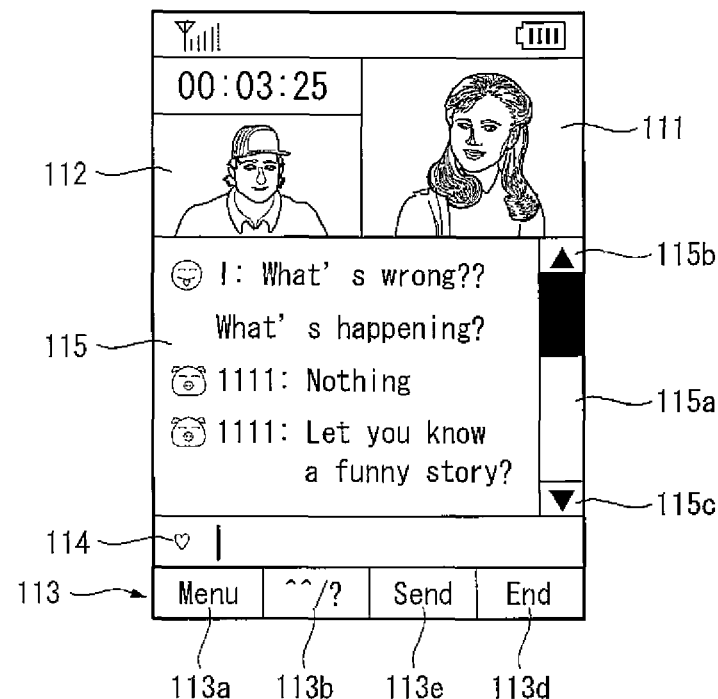
Figure 11D:
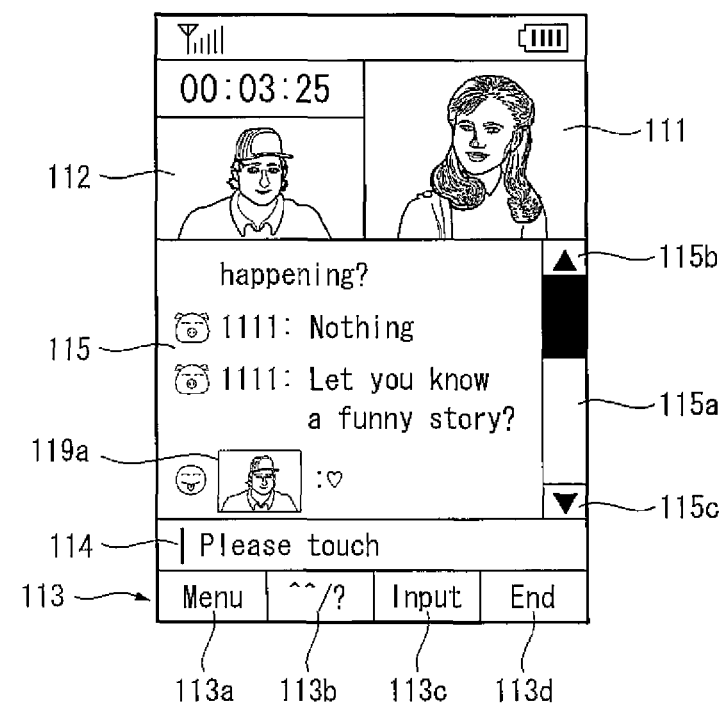

Therefore, as shown in FIG. 11c, when the user inputs random text data and transmits the text data to the other party's terminal, as a symbol for displaying text data transmitted by the user, a user image 119a captured by the user is used on the output window 115, as shown in FIG. 11d.

Figure 11E:
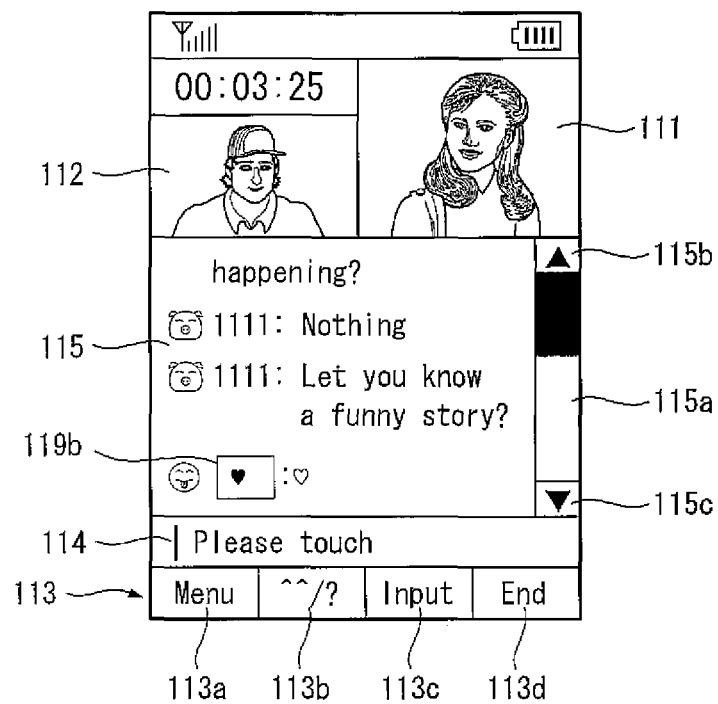

As shown in FIG. 11e, the user may use a random image 119b stored in the memory 160 in order to display the text data transmitted by the user.

Figure 12A:
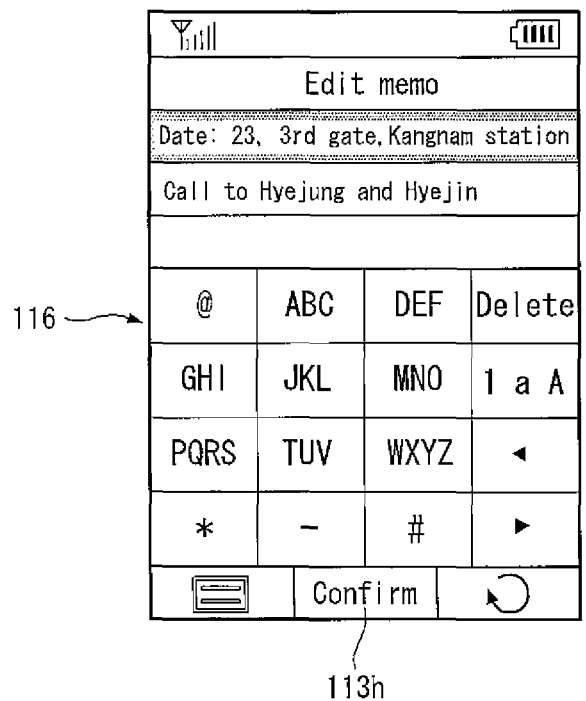
FIGS. 12a and 12b are diagrams illustrating a method of controlling a mobile communication terminal in another implementation.
Figure 12B:
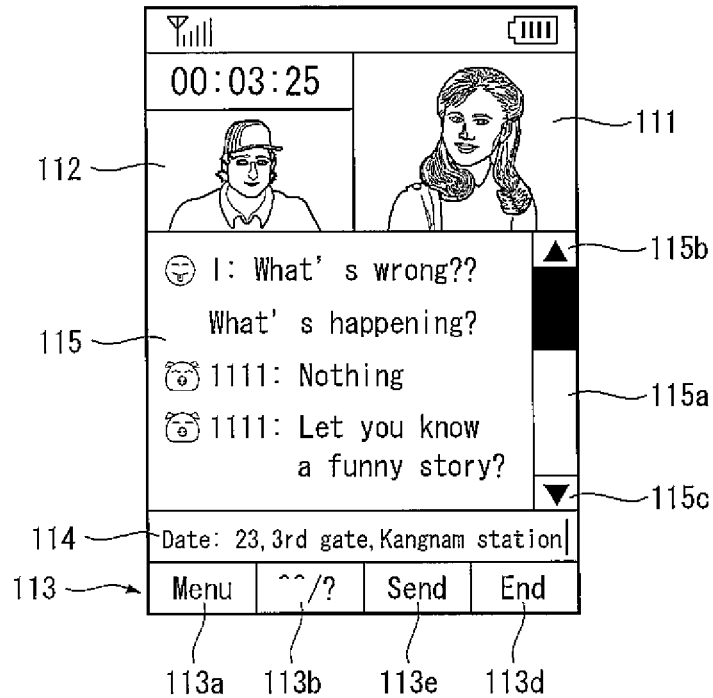

FIGS. 12a and 12b show an example of a screen for transmitting text data displayed on the touch screen 110 of the mobile communication terminal 10, while performing a video call, according to a method of controlling the mobile communication terminal in another implementation.

The user enables touch screen 110 to retrieve data, for example a short message for a Short Message Service (SMS), a memo, and a phone number, stored in the memory 160, to edit or correct the found data, and to transmit the data to the other party's terminal by executing a random application using, for example text data using a video chatting function while performing a video call.

Referring to FIG. 12a, the user enables touch screen 110 to input the memo to the mobile communication terminal 10 by copying a part of a stored memo and touching, for example a confirmation key 113h through executing a memo writing application using a video chatting function while performing a video call.

Accordingly, because a part of the memo is displayed on the input window 114, as shown in FIG. 12b, the user may correct or add the displayed data or transmit the data to the other party's terminal.

Figure 13A:
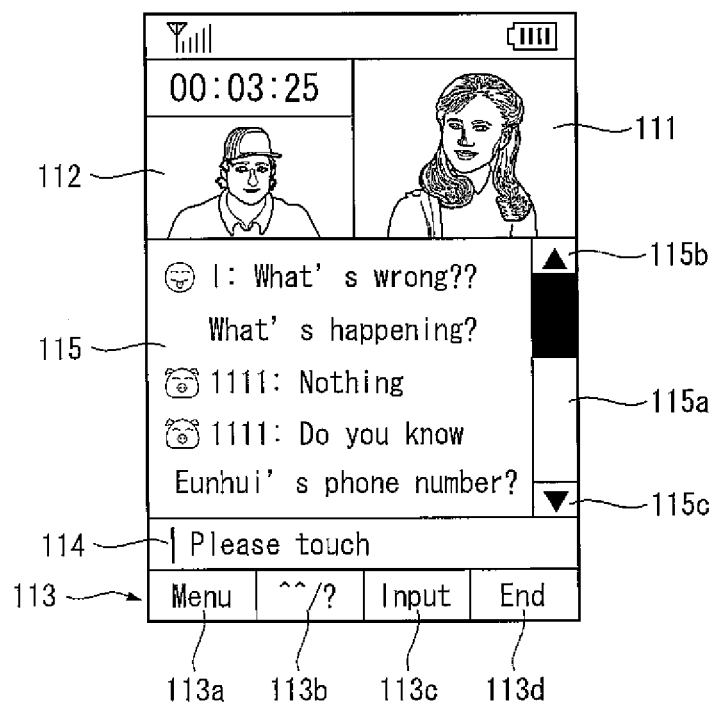
FIGS. 13a and 13b are diagrams illustrating a method of controlling a mobile communication terminal in another implementation.
Figure 13B:
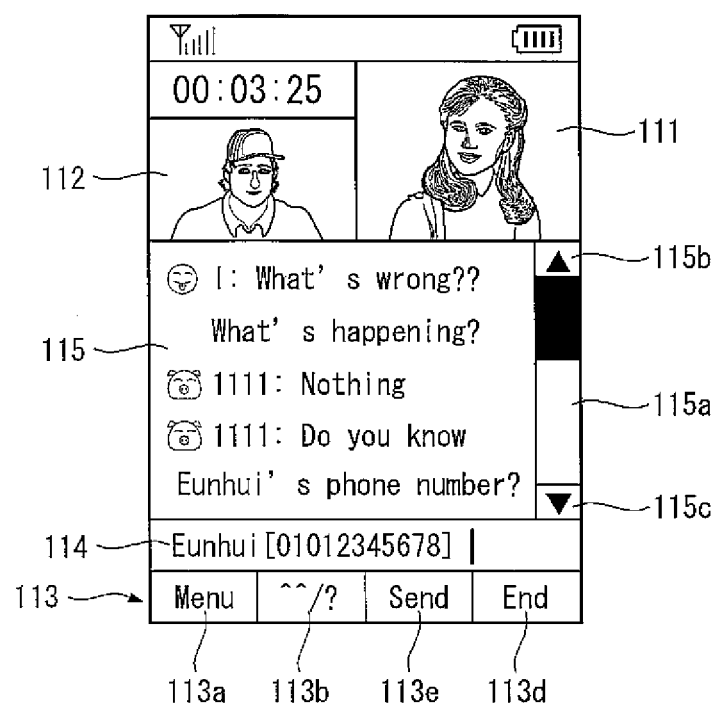

Further, the user enables touch screen 110 to retrieve, for example a phone book on the screen of FIG. 13a displayed when using a video chatting function while performing a video call and to input the found phone number to the mobile communication terminal 10, thereby displaying the phone number on the input window 114, as shown in FIG. 13b. Therefore, the user can correct the phone number displayed on the input window 114, add other text thereto, or transmit the displayed phone number to the other party's terminal.

In implementations of this document, by using a touch screen in order to transmit and receive text data while performing a video call in a mobile communication terminal having a touch screen, the mobile communication terminal can be conveniently and rapidly controlled.

The preceding embodiments enable mobile communications terminals not directly connected to one another to participate in a teleconference by way of another mobile telecommunication terminal. That is, terminal A may be in contact with terminals B and C, while terminals B and C are not in direct contact with each other. Nonetheless, with at least one of the preceding embodiments, mobile communications terminals A, B and C may all participate in teleconference and/or otherwise exchange video, audio or text data as previously described.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

Other features will be apparent from the description and drawings, and from the claims.

What is claimed is:

1. A mobile communication terminal, comprising:
  a communication module configured to exchange image and audio data of a video call with another party's terminal and to perform a text messaging session to exchange text data with the other party's terminal while performing the video call;

at least one camera;

a memory configured to store images;

a touch screen configured to display a first real-time image received from the other party's terminal and to display a second real-time image acquired from the at least one camera in real time during the video call, the first real-time image being an image of a user of the other party's terminal and the second real-time image being an image of a user currently operating the mobile communication terminal; and a controller configured to:

display a text message window include an output window and an input window while performing the text messaging session, the input window being used to input text messages to the other party's terminal, and the output window being used to display text messages between the user currently operating the mobile communication terminal and the user of the other party's terminal, display a first representative identifier indicating the user of the other party's terminal next to text messages input by the user of the other party's terminal in the output window, display a second representative identifier indicating the user of the currently operating mobile communication terminal next to text messages input by the user currently operating the mobile terminal in the output window, and selectively replace a corresponding second representative identifier for any one of the text messages input by the user currently operating the mobile communication terminal with a captured image of the user operating the mobile communication terminal, when an input for selecting the second representative identifier is received, wherein the corresponding second representative identifier is replaced without replacing previously displayed second representative identifiers.

2. The mobile communication terminal of claim 1, wherein the controller is configured to control the touch screen to vertically display the first real-time image and the second real-time image with the second real-time image being above the first real-time image.

3. The mobile communication terminal of claim 1, wherein the controller is configured to control the touch screen to scroll the text messages in the output window.

4. The mobile communication terminal of claim 1, wherein the controller is configured to control the touch screen to distinguishably display received text messages and transmitted text messages on the output window with a corresponding one of the first representative identifier and second representative identifier.

5. The mobile communication terminal of claim 1, wherein the controller is configured to transmit the captured image to the other party's terminal.

6. The mobile communication terminal of claim 1, wherein the second real-time image is displayed in an upper corner of a display window including the first and second real-time images.

7. The mobile communication terminal of claim 1, wherein the controller is further configured to display a keypad for entering text messages in the input window when the input window is touch selected.

8. The mobile communication terminal of claim 1, wherein the first real-time image of the user of the other party's terminal is displayed with a larger size than the second real-time image of the user currently operating the mobile communication terminal.

9. The mobile communication terminal of claim 1, wherein the controller is further configured to selectively replace the second representative identifier in real-time during the video call and text messaging session.

10. The mobile communication terminal of claim 1, wherein the first and second representative identifiers are displayed in a one-to-one correspondence with each text message.

11. A method of controlling a mobile communication terminal, the method comprising:

exchanging, via a communication module, image and audio data of a video call with another party's terminal and performing a text messaging session to exchange text data with the other party's terminal while performing the video call;

displaying, via a touch screen, a first real-time image received from the other party's terminal and displaying a second real-time image acquired from the at least one camera in real time during the video call, the first real-time image being an image of a user of the other party's terminal and the second real-time image being an image of a user currently operating the mobile communication ter urinal;

displaying, via the touch screen, a text message window include an output window and an input window while performing the text messaging session, the input window being used to input text messages to the other party's terminal, and the output window being used to display text messages between the user currently operating the mobile communication terminal and the user of the other party's terminal;

displaying, via the touch screen, a first representative identifier indicating the user of the other party's terminal next to text messages input by the user of the other party's terminal in the output window;

displaying, via the touch screen, a second representative identifier indicating the user of the currently operating mobile communication terminal next to text messages input by the user currently operating the mobile communication terminal in the output window; and selectively replacing, via a controller, a corresponding second representative identifier for any one of the text messages input by the user currently operating the mobile communication terminal with a captured image of the user operating the mobile terminal, when an input for selecting the second representative identifier is receive, wherein the corresponding second representative identifier is replaced without replacing previously displayed second representative identifiers.

12. The method of claim 11, further comprising:
vertically displaying the first real-time image and the second real-time image with the second real-time image being above the first real-time image.

13. The method of claim 11, further comprising:
scrolling the text messages in the output window.

14. The method of claim 11, further comprising:
distinguishably displaying received text messages and transmitted text messages on the output window with a corresponding one of the first representative identifier and second representative identifier.

15. The method of claim 11, further comprising:
transmitting the captured image to the other party's terminal.

16. The method of claim 11, wherein the second real-time image is displayed in an upper corner of a display window including the first and second real-time images.

17. The method of claim 11, further comprising:
displaying on the touch screen a keypad for entering text messages in the input window when the input window is touch selected.

18. The method of claim 11, wherein the first real-time image of the user of the other party's terminal is displayed with a larger size than the second real-time image of the user currently operating the mobile communication terminal.

19. The method of claim 11, wherein the replacing step selectively replaces the second representative identifier in real-time during the video call and text messaging session.

20. The method of claim 11, wherein the first and second representative identifiers are displayed in a one-to-one correspondence with each text message.

\* \* \* \* \*